(12) United States Patent
Velazco

(10) Patent No.: US 10,581,525 B2
(45) Date of Patent: Mar. 3, 2020

(54) METHOD AND APPARATUS FOR OMNIDIRECTIONAL OPTICAL COMMUNICATION

(71) Applicant: California Institute of Technology, Pasadena, CA (US)

(72) Inventor: Jose E Velazco, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 16/218,394

(22) Filed: Dec. 12, 2018

(65) Prior Publication Data

US 2019/0229805 A1 Jul. 25, 2019

Related U.S. Application Data

(60) Provisional application No. 62/620,315, filed on Jan. 22, 2018.

(51) Int. Cl.

| | |
|---|---|
| *H04B 10/118* | (2013.01) |
| *H04B 7/185* | (2006.01) |
| *H04B 10/50* | (2013.01) |
| *H04B 10/27* | (2013.01) |
| *H04B 10/66* | (2013.01) |
| *G02B 26/08* | (2006.01) |
| *G01S 3/782* | (2006.01) |
| *G01S 19/13* | (2010.01) |

(52) U.S. Cl.
CPC .......... *H04B 10/118* (2013.01); *G01S 3/782* (2013.01); *G02B 26/0833* (2013.01); *H04B 7/18502* (2013.01); *H04B 10/27* (2013.01); *H04B 10/503* (2013.01); *H04B 10/66* (2013.01); *G01S 19/13* (2013.01)

(58) Field of Classification Search
CPC ..... G01S 19/13; G01S 3/782; G02B 26/0833; H04B 10/118; H04B 10/27; H04B 10/503; H04B 10/66; H04B 7/18502
USPC .................................................. 398/118–130
See application file for complete search history.

(56) References Cited

U.S. PATENT DOCUMENTS

| | | | |
|---|---|---|---|
| 2012/0206913 A1* | 8/2012 | Jungwirth | ............... F21S 8/006 362/235 |
| 2014/0270749 A1* | 9/2014 | Miniscalco | .......... H04B 10/118 398/5 |

(Continued)

*Primary Examiner* — Amritbir K Sandhu
(74) *Attorney, Agent, or Firm* — Steinfl + LLP

(57) ABSTRACT

An omnidirectional optical communication system. The omnidirectional optical communication system includes a multifaceted structure, a laser transmitter with a steerable mechanism, an optical detector receiver, and an angle-of-arrival system. In one aspect, the laser transmitter with a steerable mechanism, the optical detector receiver, and the angle-of-arrival system are housed in within the multifaceted structure, which enables omnidirectional optical communication. In another aspect, the omnidirectional optical communication system is used in a spacecraft for inter-spacecraft omnidirectional optical communication. In yet another aspect, the omnidirectional optical communication system is used in terrestrial applications for gigabit communications in WiFi, inter smartphones, internet of things and smart cities. In yet another aspect, the omnidirectional optical communication system further includes a global positioning system.

20 Claims, 28 Drawing Sheets

(56) References Cited

U.S. PATENT DOCUMENTS

| | | | |
|---|---|---|---|
| 2014/0294399 A1* | 10/2014 | Makowski | H04B 10/1123 398/126 |
| 2014/0376001 A1* | 12/2014 | Swanson | G01N 21/17 356/479 |
| 2015/0009485 A1* | 1/2015 | Mheen | G01S 17/87 356/4.01 |
| 2015/0298827 A1* | 10/2015 | Nguyen | B64G 1/365 701/13 |
| 2016/0043800 A1* | 2/2016 | Kingsbury | H04B 10/118 398/125 |
| 2016/0204866 A1* | 7/2016 | Boroson | H04B 10/1121 398/97 |
| 2016/0226584 A1* | 8/2016 | Chalfant, III | H04B 10/112 |

* cited by examiner

Fig. 8A
Fig. 8B
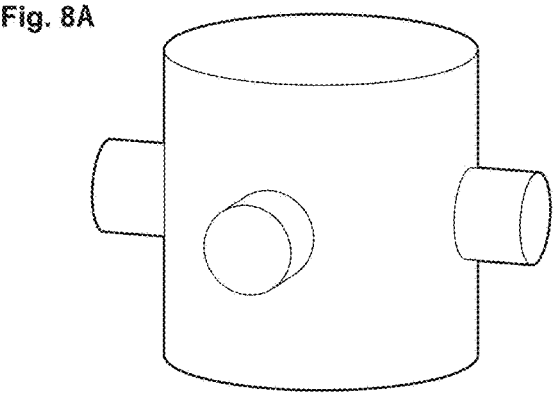
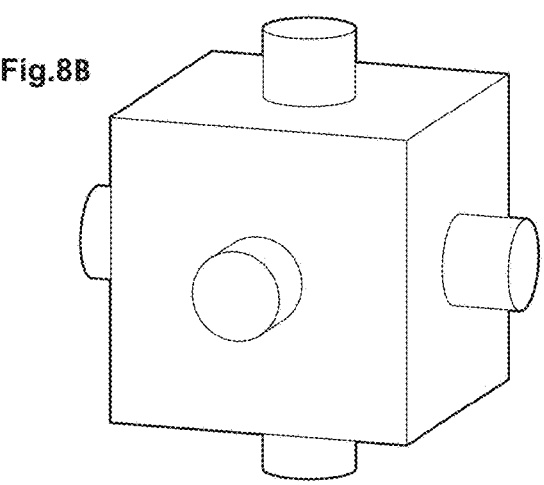
Fig. 8C
Fig. 8D
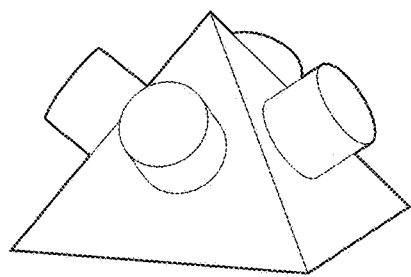
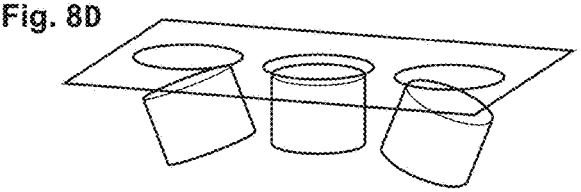

STRING OF PEARLS

CROSS-TRACK SCANS

AZIMUTH SCAN

MULTI FREE ORBIT ELLIPSE

NADIR CIRCLE

DUAL SIDE SCAN

METHOD AND APPARATUS FOR OMNIDIRECTIONAL OPTICAL COMMUNICATION

CROSS-REFERENCE TO RELATED APPLICATIONS

The present application claims priority to U.S. Provisional Patent Application No. 62/620,315 filed on Jan. 22, 2018, entitled "Omnidirectional Optical Communicator", the contents of which are hereby incorporated by reference in their entirety.

FEDERAL SUPPORT STATEMENT

The invention described herein was made in the performance of work under a NASA contract NNN12AA01C and is subject to the provisions of Public Law 96-517 (35 USC 202) in which the Contractor has elected to retain title.

BACKGROUND

(1) Technical Field

The present teachings generally relate to optical communications, and more specifically to an omnidirectional optical communicator.

(2) Background

Generally, spacecraft constellations use radio frequency (RF) signals for both crosslink and up/down-link. As spacecraft sensor sophistication and demands for higher resolution increase, the amount of data they collect and capture will tend to grow drastically. Sharing this increasingly large amount of data with other spacecraft and with ground stations creates a great demand for faster data transfer mechanisms. Spacecraft data transfer is ordinarily achieved using RF signals and is typically limited to speeds of hundreds of megabits per second. As sensor resolution continues to improve and as the amount of data continues to increase, the requirements for faster data transfer will continue to increase as well.

RF communications will eventually become the bottleneck that limits the amount of data transfer per unit time. Laser communications, using single telescopes, has promise in providing higher data rates, however, it suffers from beam pointing issues.

Furthermore, it is estimated that for future terrestrial applications such as wireless communications between cars, high data rate WiFi, direct intra-smartphone communications, drone communications, the internet of things, smart cities, there will be a need for a new paradigm shift in high data rate, multiple-link communications system.

Accordingly, there is a need for a high data rate, wireless data transfer system that will allow a drastic increase in data transfer speeds, where multi gigabit per second wireless data transfer rates can be achieved in an omnidirectional manner. Furthermore, there is a need to solve the pointing issue of conventional laser communications, which would allow establishing and maintaining multiple communications links simultaneously.

SUMMARY

Various embodiments of an omnidirectional optical communicator are disclosed. Moreover, various embodiments showing the usage of optical communicator within satellite constellation system are also disclosed.

In one disclosed embodiment, an omnidirectional optical communicator consists of an optical transceiver system that includes a fast processor chip and a set of optical transceivers suitably located within the device so as to allow omnidirectional coverage. The fast processor chip may be a field programmable gate array (FPGA), microcontroller, or single-board-computer. The omnidirectional optical communicator includes a multifaceted structure, where each facet holds a transceiver. The transceivers are suitably located within the omnidirectional optical communicator to allow omnidirectional coverage. Each transceiver is composed of a laser diode transmitter and an optical detector. A person skilled in the art would understand that an array of lasers and detectors could also be employed. The transmitting laser can be modulated at up to multi gigabit per second speeds. Each transmitter module may be furnished with a steerable mechanism in order to provide full field of regard coverage.

The omnidirectional optical communicator allows simultaneous data transfer in all directions at very high rates. The omnidirectional optical communicator also allows multiple links to be maintained simultaneously. The data rates allowed by the omnidirectional optical communicator are many orders of magnitude higher than any current data transfer technology based on radio frequency (RF) transceivers.

In another embodiment, the omnidirectional optical communicator provides full spherical coverage of its surroundings by using a multifaceted structure with each facet holding a transceiver.

In yet another embodiment, the transmitting module includes a laser diode, a collimator, a fixed mirror and a steerable micro-electro-mechanical systems (MEMS) mirror. In this embodiment, the collimator collimates the beam before it strikes the fixed mirror. The fixed mirror directs the laser onto the MEMS mirror and the MEMS mirror steers the optical beam within its field of regard. The entire transmitter free space telescope can each operate at speeds of multi gigabits per second.

In some embodiments, the transceiver includes a receiver. The receiver includes a high sensitivity detector, such as an avalanche photo detector (APD) in order to receive optical signals. The receiver may further include a focusing lens for gain improvement, which could also be steerable or fixed.

In an alternate embodiment, each omnidirectional optical communicator may include a positioning system, such as GPS. In addition, each omnidirectional optical communicator may include a direction-of-arrival (DOA) mechanism, which would allow the calculation of the DOA information from incoming signal. Once the DOA information is obtained, the corresponding laser transmitter can be steered in the DOA direction for establishing communications with a pairing omnidirectional optical communicator. The purpose of the DOA mechanism is to determine exact position of the pairing omnidirectional optical communicator and to steer its transmitter in that direction for establishing full communications.

As an example, two omnidirectional optical communicators are linked together, where one is transmitting and the other is receiving information, such as an image. The transmitting omnidirectional optical communicator, upon intercepting the pairing signal, would use its DOA system to determine the exact location of the pairing omnidirectional optical communicator. Subsequently, the corresponding laser in the DOA can be directed towards the DOA direction in order to start the transfer of the image. The DOA mechanism is always active so that it can monitor any changes in DOA, in order to keep the link alive. The image transfer rate can be achieved at multi gigabit per second speeds with the appropriate aperture size and appropriate distance between the omnidirectional optical communicators.

In another example, an omnidirectional optical communicator includes a dodecahedron geometry that can fit inside a cube shaped satellite (CubeSat™). This omnidirectional optical communicator, used for inter-spacecraft communication, utilizes an array of avalanche photo detectors, and further utilizes gimbal-less MEMS scanning mirrors for beam steering. As used herein, a spacecraft is a vehicle or machine designed to fly in outer space. Spacecraft are used for a variety of purposes, including communications, earth observation, meteorology, navigation, space colonization, planetary exploration, and transportation of humans and cargo.

In certain embodiments, the omnidirectional optical communicator is miniaturized by using integrated photonics to render miniature optical communicators that can be fitted into smartphones, appliances, cameras, laptops.

In an advantageous embodiment, the omnidirectional optical communicator provides gigabit communications for future terrestrial applications such as wireless communications between cars, high data rate WiFi, direct intra-smartphone communications, drone communications, the Internet of Things, smart cities.

In yet another alternate embodiment, an omnidirectional optical communicator is presented, the omnidirectional optical communicator comprising a multifaceted structure, a laser transmitter having a steerable mechanism, an optical detector having a focusing lens, and an angle-of-arrival system, wherein the laser transmitter, the optical detector and the angle-of-arrival system are all housed in the multifaceted structure, and enable omnidirectional optical communication.

BRIEF DESCRIPTION OF THE DRAWINGS

The disclosed apparatus, in accordance with one or more various embodiments, are described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

FIGS. 8A-8D show examples of alternative geometrical arrangements of the transmitter/receiver module housing for the omnidirectional optical communicator.

Like reference numbers and designations in the various drawings indicate like elements.

DETAILED DESCRIPTION

The omnidirectional optical communicator uses an optical carrier for ultrafast wireless data transfer. The omnidirectional optical communicator using an array of strategically positioned optical telescopes solves the pointing issue of conventional laser communications and allows establishing and maintaining multiple communications links simultaneously. Unparalleled data transfer rates of multi gigabits per second are achieved by using a set of optical transceivers with appropriate apertures and distances. The description of figures below provide further details the omnidirectional optical communicator.

Figure 1:
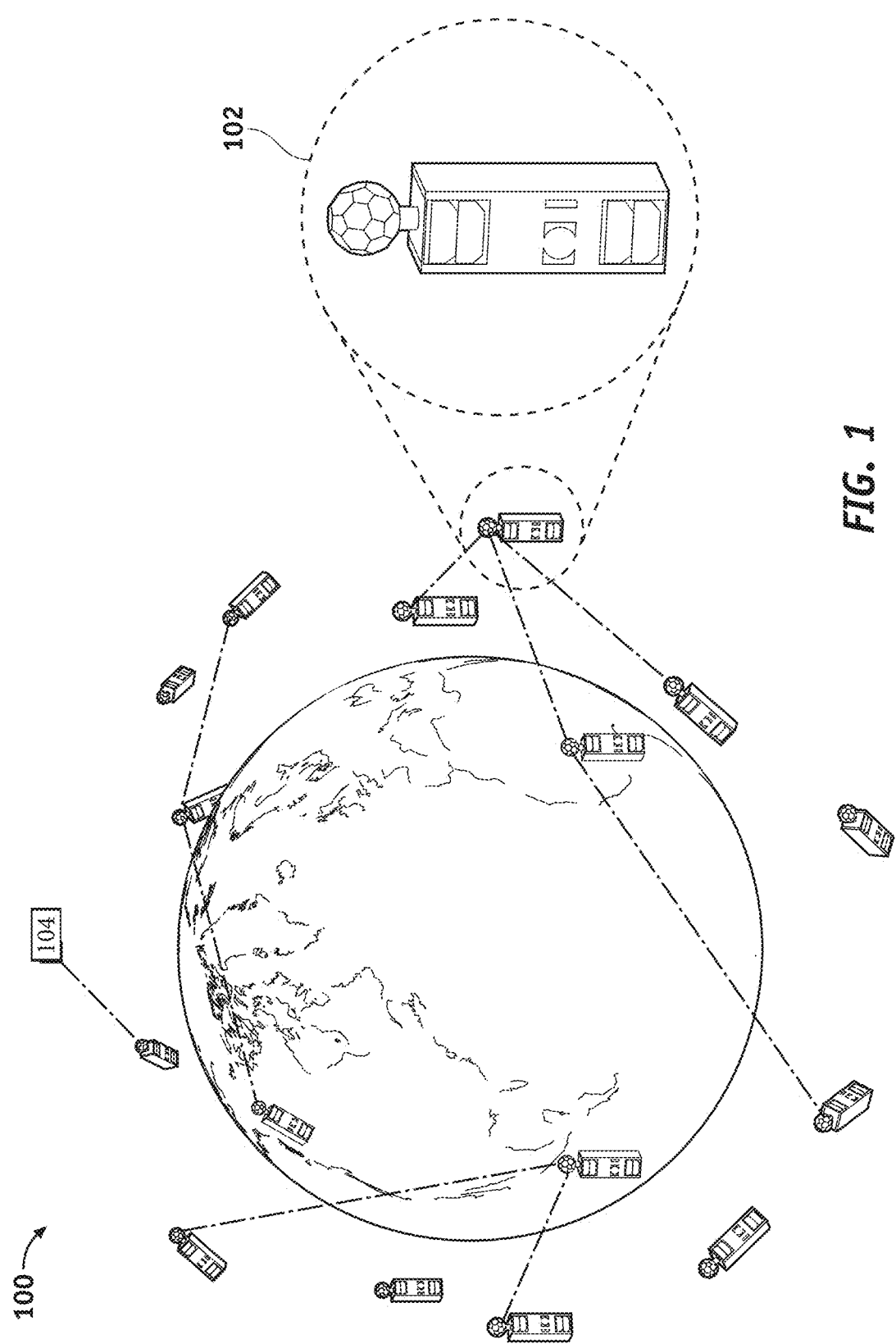
FIG. 1 shows an example of an array of small spacecraft networked by a system of omnidirectional optical communicators.

FIG. 1 shows an example of an array of small spacecraft networked by a system of omnidirectional optical communicators. The spacecraft are shown around earth orbit. The spacecraft use omnidirectional optical communicators with truncated dodecahedron geometry. As shown, these spacecrafts have the capability to simultaneously communicate using the omnidirectional optical communicators. A CubeSat 120 with an omnidirectional optical communicator 104 is also shown.

Figure 2:
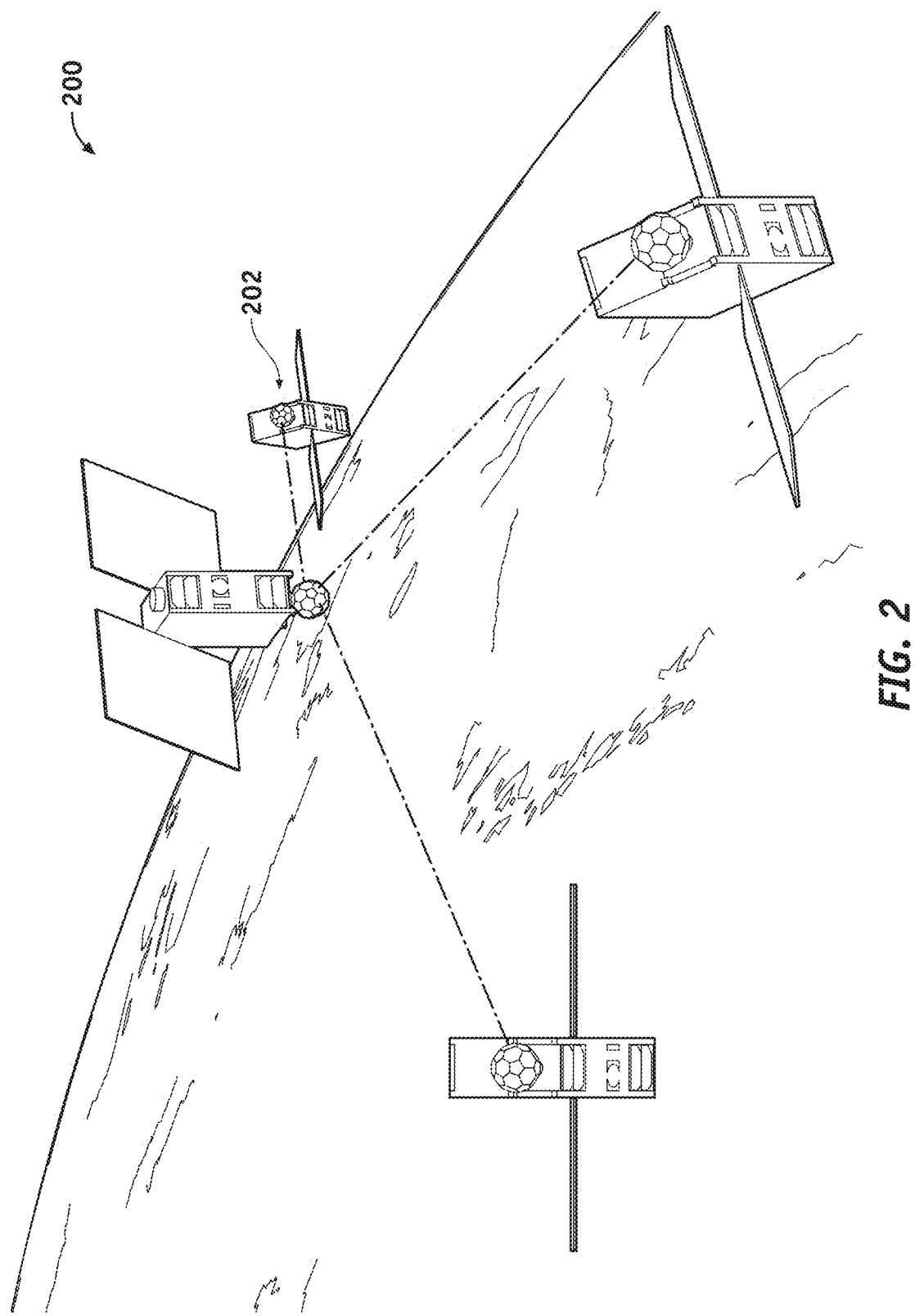
FIG. 2 shows an example of a group of CubeSats with omnidirectional optical communicator while in formation.

FIG. 2 shows an example of a group of CubeSats with omnidirectional optical communicator while in formation. The omnidirectional optical communicators on each satellite is shown to be in communication with the rest of the satellites. Full sky coverage and multiple simultaneous links are enabled using the omnidirectional optical communicators. This CubeSat arrangement, where all the spacecraft can rapidly communicate with each other via the omnidirectional optical communicator, can enable the implementation of large spaceborne sensors.

Figure 3:
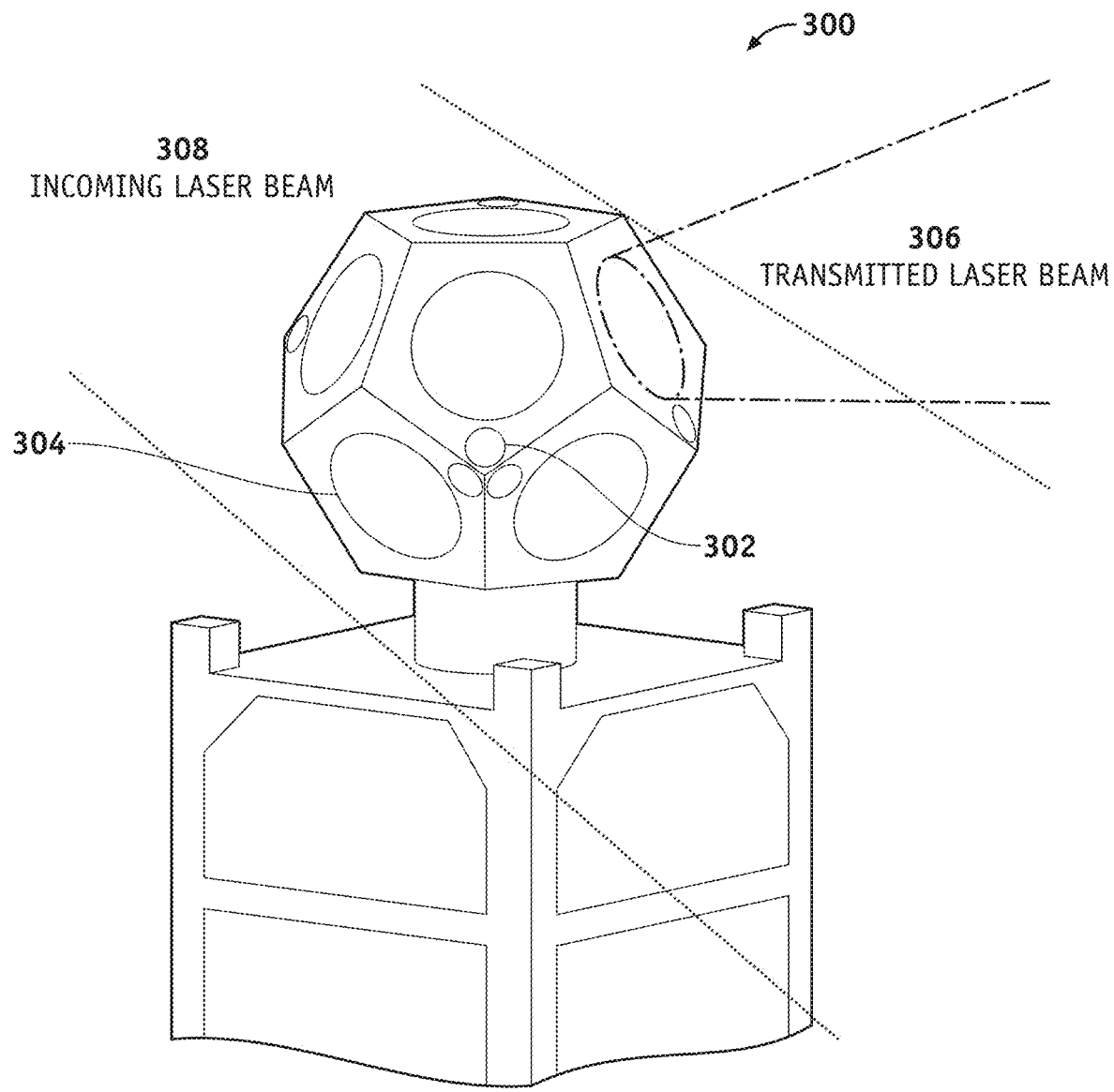
FIG. 3 shows an example of an omnidirectional optical communicator featuring dodecahedron geometry with details shown, such as incoming laser beam, transmitted laser beam, high aperture lens and photon counting detectors for direction of arrival (DOA) calculation.

FIG. 3 shows an example of an omnidirectional optical communicator 300 featuring multi-faceted structure using dodecahedron geometry. The omnidirectional optical communicator 300 includes receivers for detecting incoming laser beam 308, laser transmitters for transmitting laser beam 306, high aperture lens 304, and photon counting avalanche photo detectors (APD) 302, which are used for direction of arrival (DOA) calculation. DOA is also referred to herein as angle-of-arrival (AoA). The omnidirectional optical communicator can simultaneously receive and transmit. This enables simultaneous communication with multiple spacecraft.

Figure 4:
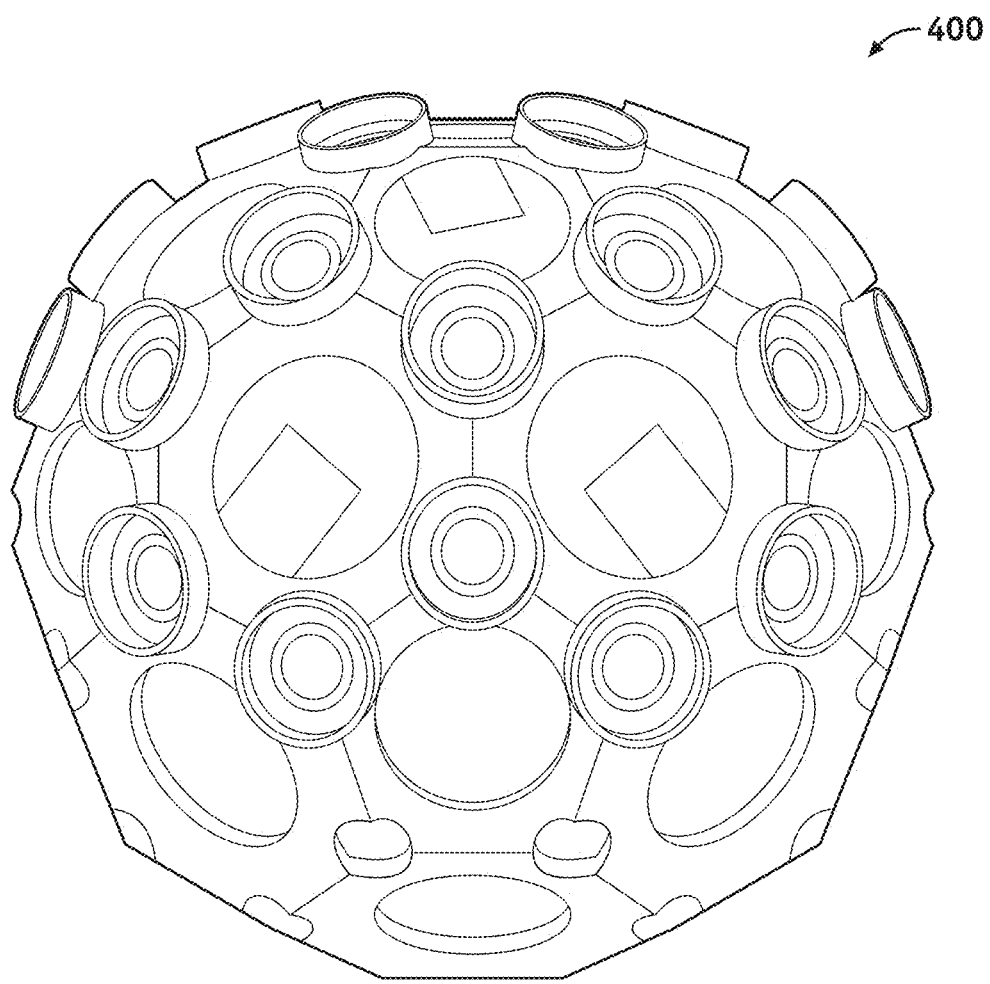
FIG. 4 shows an example of a multifaceted structure using a truncated dodecahedron geometry.

FIG. 4 shows an example of an omnidirectional optical communicator featuring multifaceted structure 400 using truncated dodecahedron geometry. The truncated dodecahedron geometry enables multifaceted transmit and receive. Furthermore, the dodecahedron geometry enables optimized high-speed inter-satellite link and enables simultaneous communication with multiple spacecraft.

Figure 5:
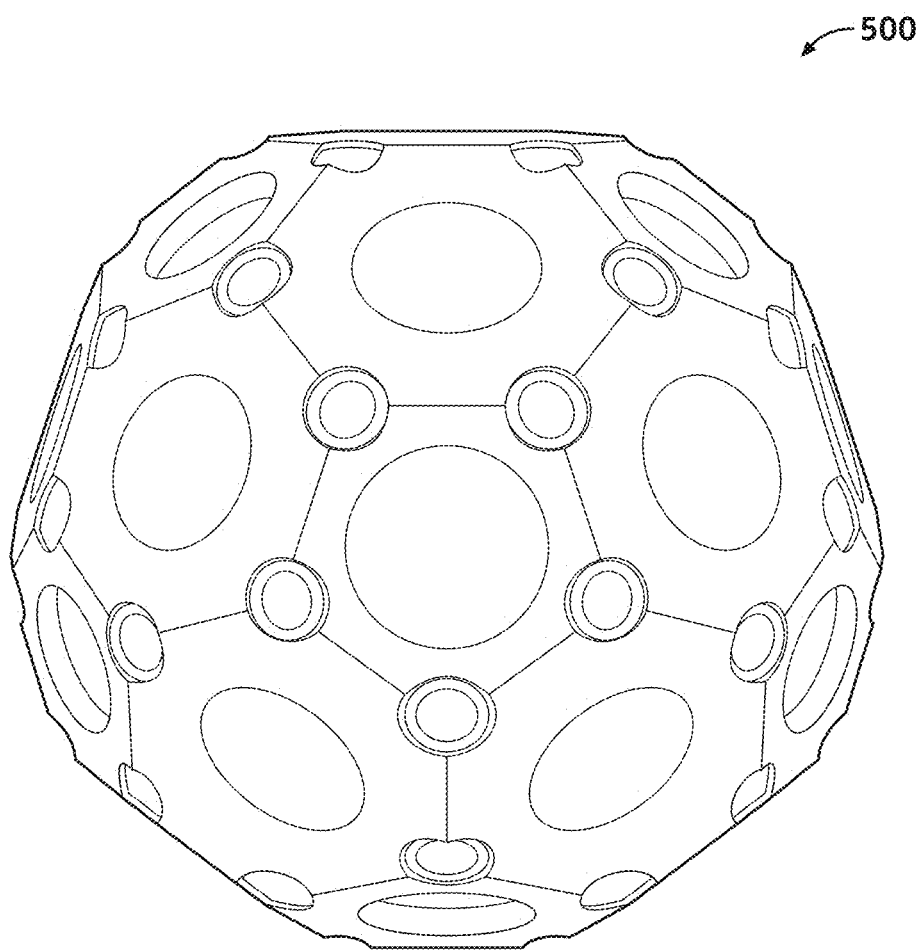
FIG. 5 shows another exemplary embodiment of a multifaceted structure using a truncated dodecahedron geometry.

FIG. 5 shows another exemplary embodiment of an omnidirectional optical communicator featuring multifaceted structure 500 using dodecahedron geometry.

Figure 6:
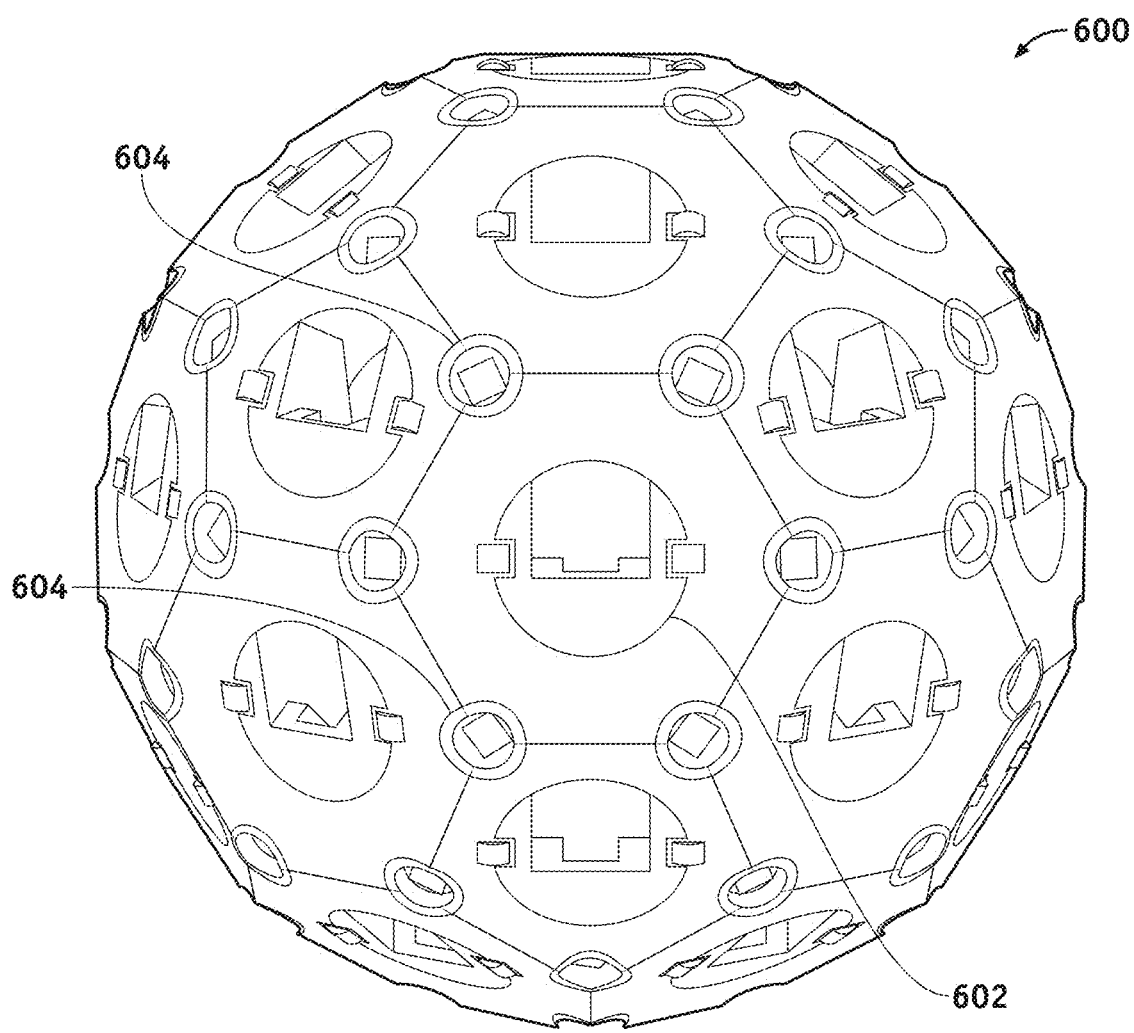
FIG. 6 shows an example of the placement of transmit telescope and detectors in the multifaceted structure of FIG. 5.

FIG. 6 shows an example of the placement of transmit telescope 602 and detectors 604 in the multifaceted structure of FIG. 5. It will be understood by those skilled in the art that an array of transmitter telescopes and detectors can also be employed. In order to provide full coverage of the field-of-regard of each laser, each transmitter module can be furnished with a steerable mechanism. It will be understood by those skilled in the art that beam steering mechanism includes but is not limited to MEMS, piezo, voice-coil mirror, tunable prism, or tunable index of refraction membrane systems.

Figure 7:
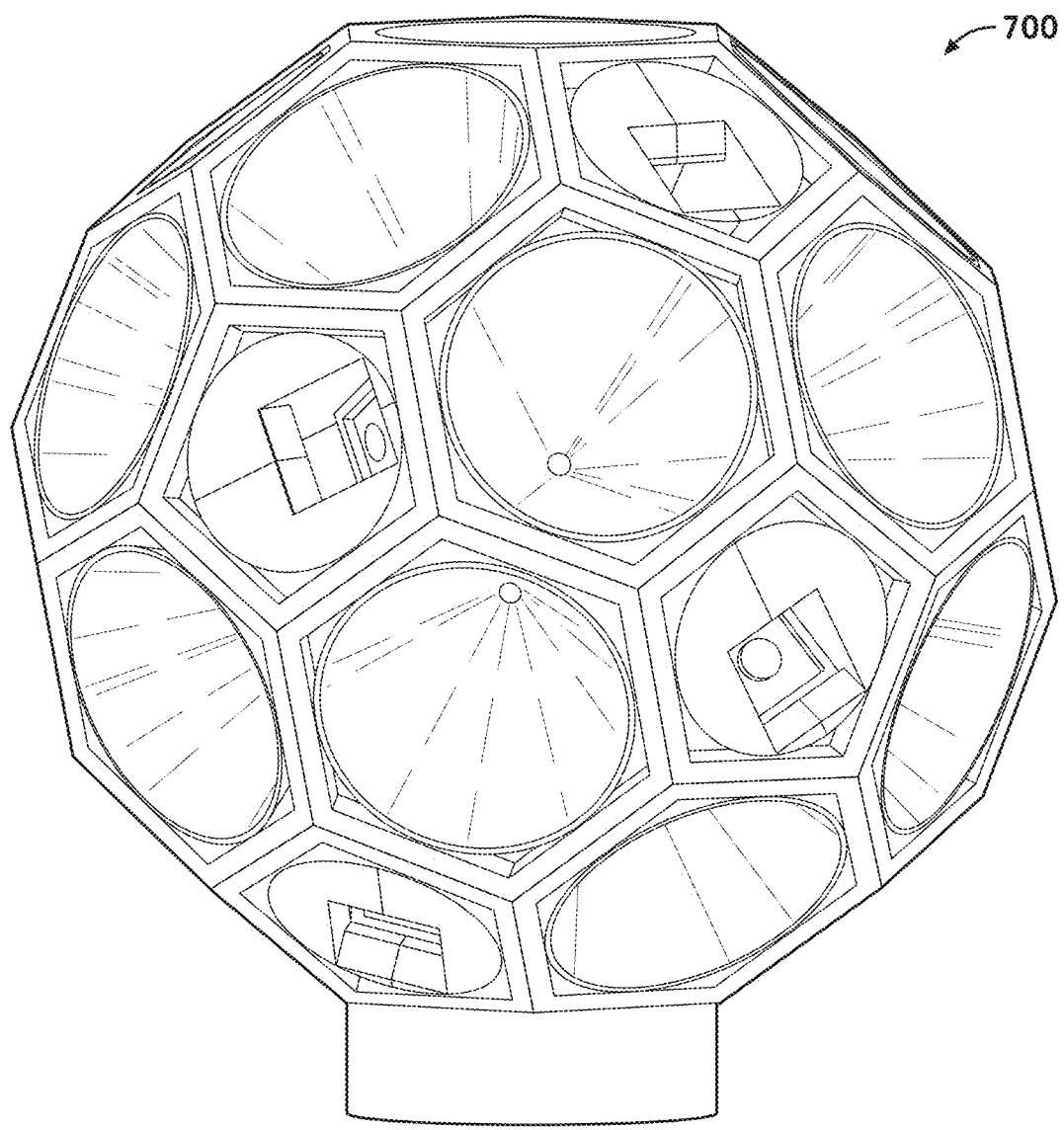
FIG. 7 shows an example of a truncated dodecahedron geometry used for a multifaceted structure.

FIG. 7 shows an example of a truncated dodecahedron geometry used for a multifaceted structure. The diameter of the shown device is about 4 inches. In this embodiment the truncated dodecahedron allows for 32 facets to be employed which can be filled with an array of miniature transmit telescopes and detectors for full sky coverage.

FIGS. 8A-8D show examples of alternative geometrical arrangements of the transmitter/receiver module housing for the omnidirectional optical communicator. These geometries, or a combination thereof, offer tradeoffs between mass, performance, and other parameters.

Figure 9:
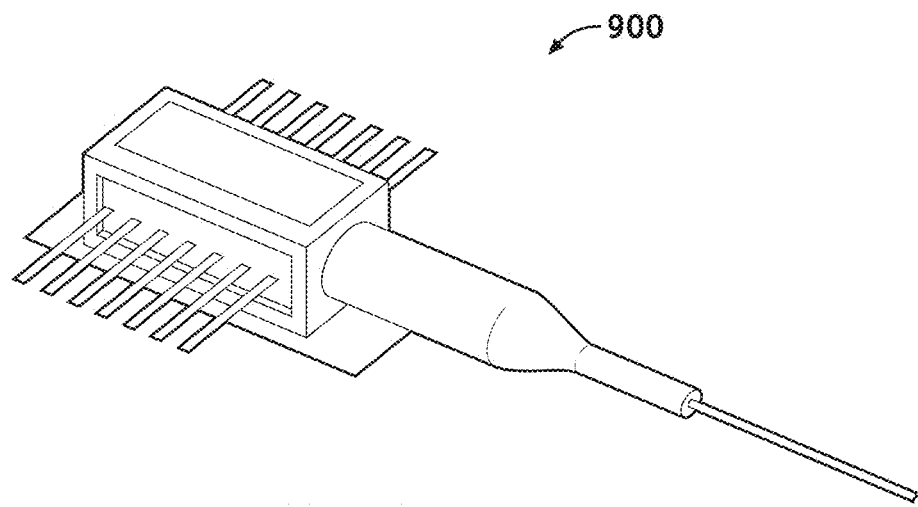
FIG. 9 shows an example of a laser diode device used in an omnidirectional optical communicator.

FIG. 9 shows an example of a laser 900 used in an omnidirectional optical communicator. Suitable laser wavelength is chosen according to the application.

Figure 10:
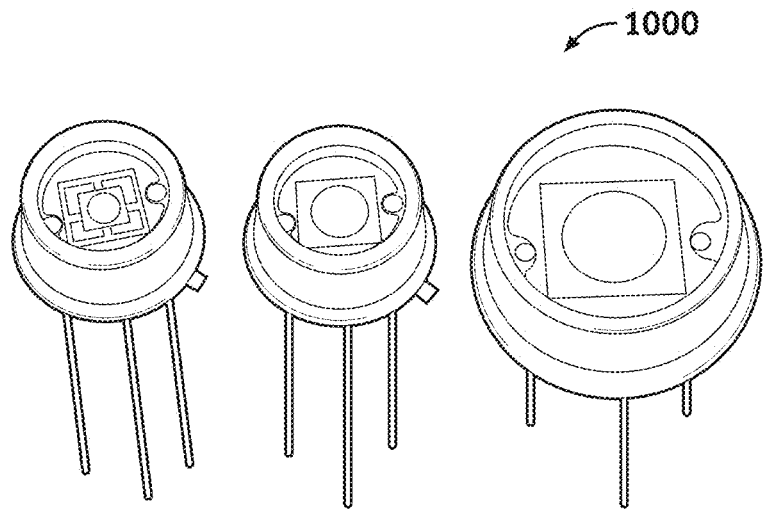
FIG. 10 shows an example of a set of detectors used in an omnidirectional optical communicator.

FIG. 10 shows an example of a set of detectors 1000 used in an omnidirectional optical communicator. These detectors are used to detect incoming laser beams. The detector technology is selected so as to allow multi gigabit per second transmission data rates.

Figure 11A:
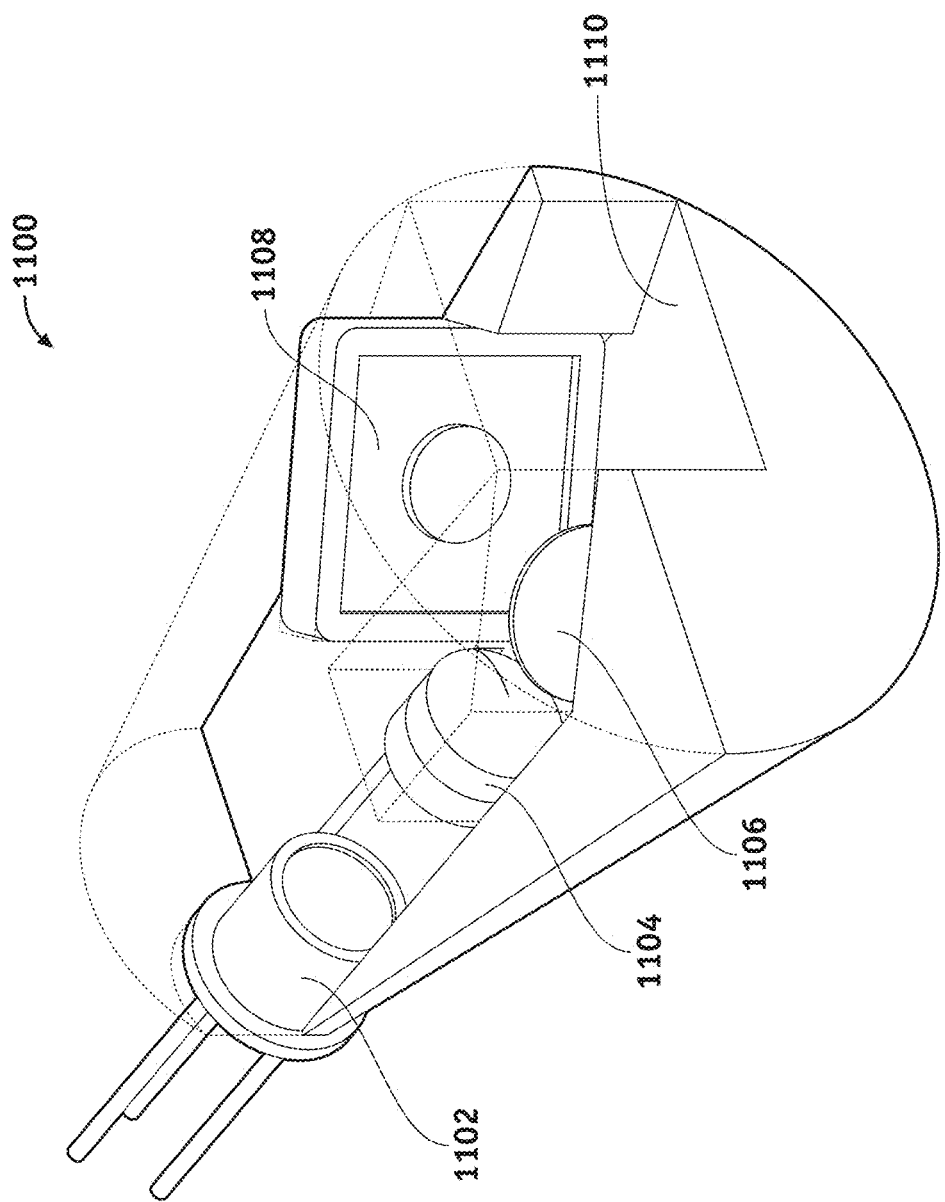
FIG. 11A shows an example of an omnidirectional optical communicator transmit telescope including a laser diode, collimator, mirror, MEMS mirror and transmit aperture.

FIG. 11A shows an example of an omnidirectional optical communicator transmit telescope 1100. The transmit telescope includes a laser diode 1102, a collimator 1104, a fixed mirror 1106, a steerable MEMS mirror 1108 and a transmit aperture 1110. The laser diode 1102 generates a laser beam, which is then collimated by the collimator 1104 before it strikes the fixed mirror 1106. The fixed mirror 1106 directs the laser onto the MEMS mirror 1108, where the MEMS mirror steers the optical beam within its field of regard. This configuration of transmitter free-space telescope enables operating data rates of multi-gigabits per second. Transmit telescope 1100 body could be shaped so that it suitably fits in telescope openings 602.

Figure 11B:
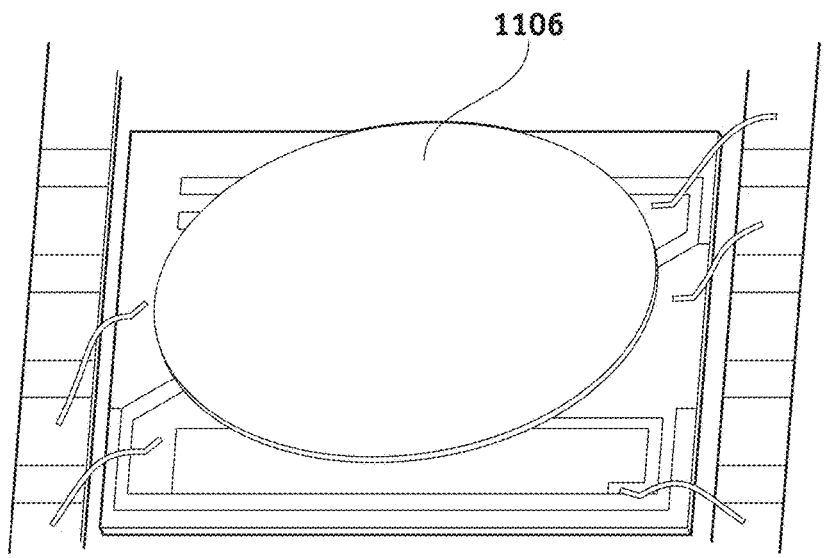
FIG. 11B shows an example of details of the MEMS mirror of FIG. 11A.

FIG. 11B shows an example of details of the MEMS mirror 1108 used in FIG. 11A. The MEMS mirror shown is a gimbal-less, 4-quadrant MEMS mirrors are typically used in tip-tilt (two-axis rotation) mode.

Figure 11C:
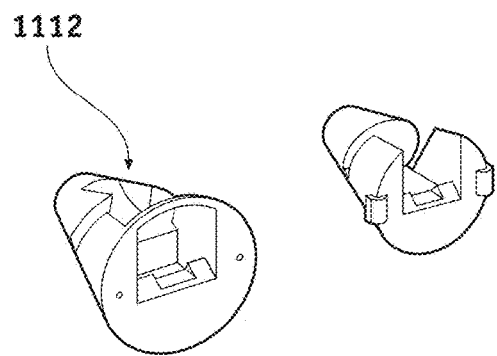
FIG. 11C shows an example of details of the transmit telescope of FIG. 11A.

FIG. 11C shows an example of details of the mechanical structure holding a laser diode 1102, collimator 1104, mirror 1106 of FIG. 11A.

Figure 11D:
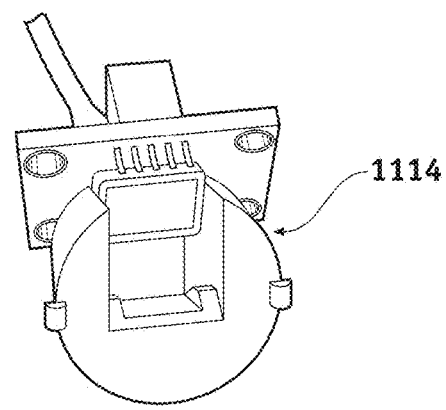
FIG. 11D shows an example of details of a lab demo unit of a transmit telescope.

FIG. 11D shows an example of details of a lab demo unit of a transmit telescope 1100.

Figure 12:
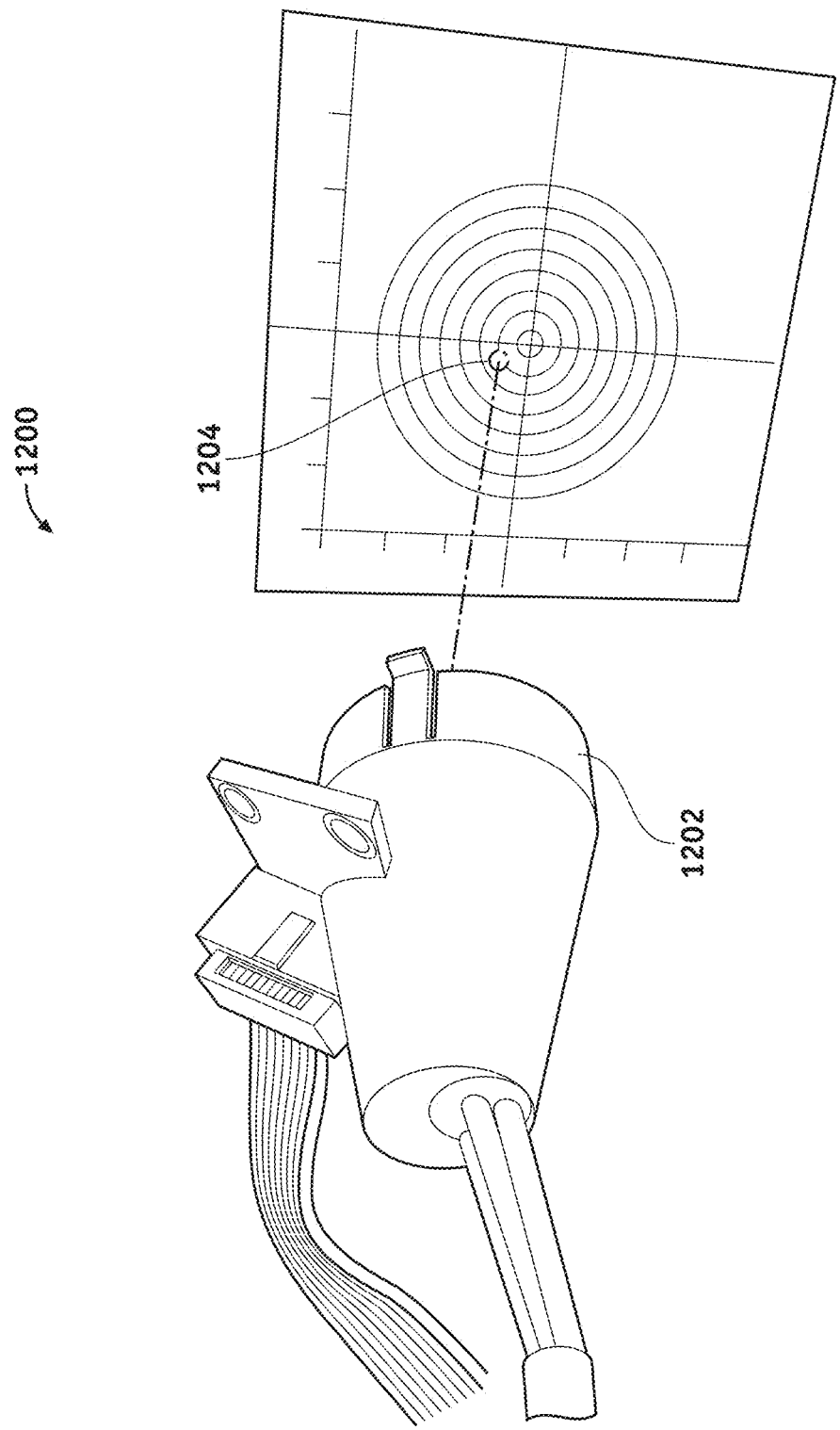
FIG. 12 shows an example of a set up for the testing of a miniaturized transmit telescope.

FIG. 12 shows an example of a set up for the testing of a miniaturized laser transmit telescope 1202. The laser transmit telescope 1202 is shown being tested in the lab, where a laser beam 1204 is generated and directed at a target.

Figure 13:
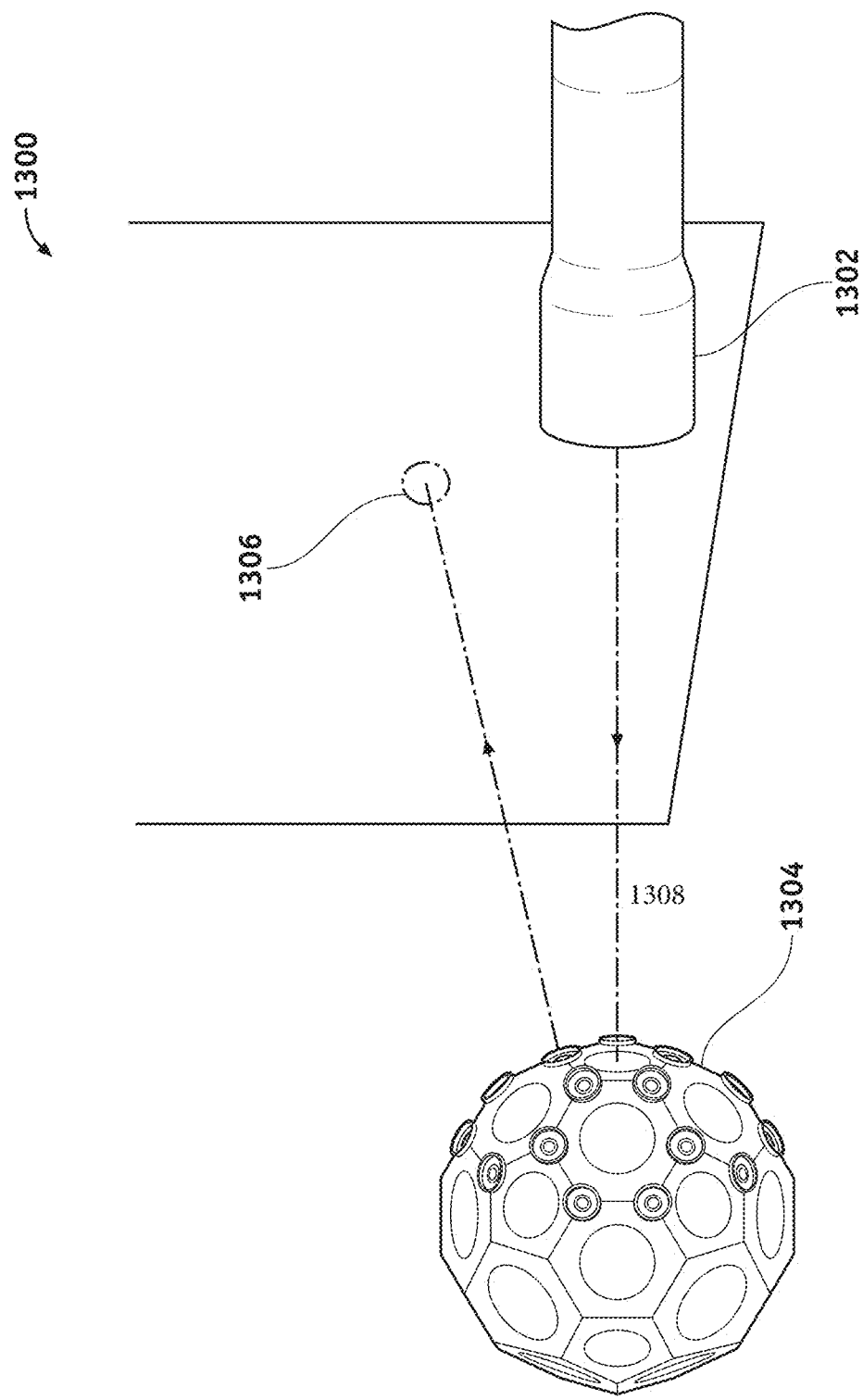
FIG. 13 shows another example of a set up for the testing directional of arrival and actuation of a miniaturized transmit telescope.

FIG. 13 shows another example of a set up for the testing of a miniaturized laser transmit telescope 1302. The laser transmit telescope 1302 is shown being tested in the lab, where a laser beam 1308 is directed at a lab demo of an omnidirectional optical communicator, where the omnidirectional optical communicator receives the incoming beam, calculates angle-of-arrival, selects an appropriate transmit telescope and transmits a laser beam generating a laser beam spot 1306.

Figure 14:
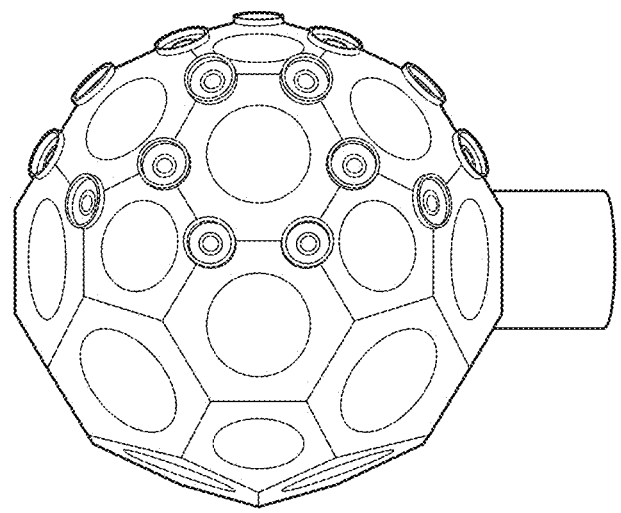
FIG. 14 shows an example of a lab demonstration set up emulating a spacecraft constellation using pan-tilt platforms.
Figure 14:
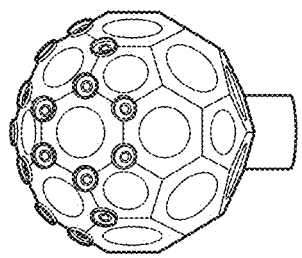
Figure 14:
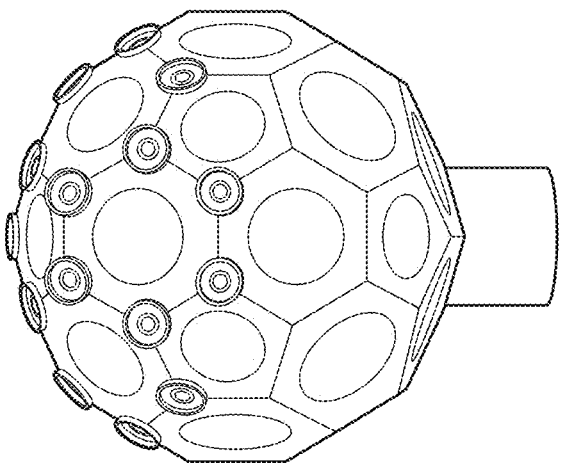

FIG. 14 shows an example of a lab demonstration set up emulating a constellation using pan-tilt platforms. The omnidirectional optical communicators are tested in the lab using a platform that has tilt capability to emulate relative motion among the spacecraft.

Figure 15:
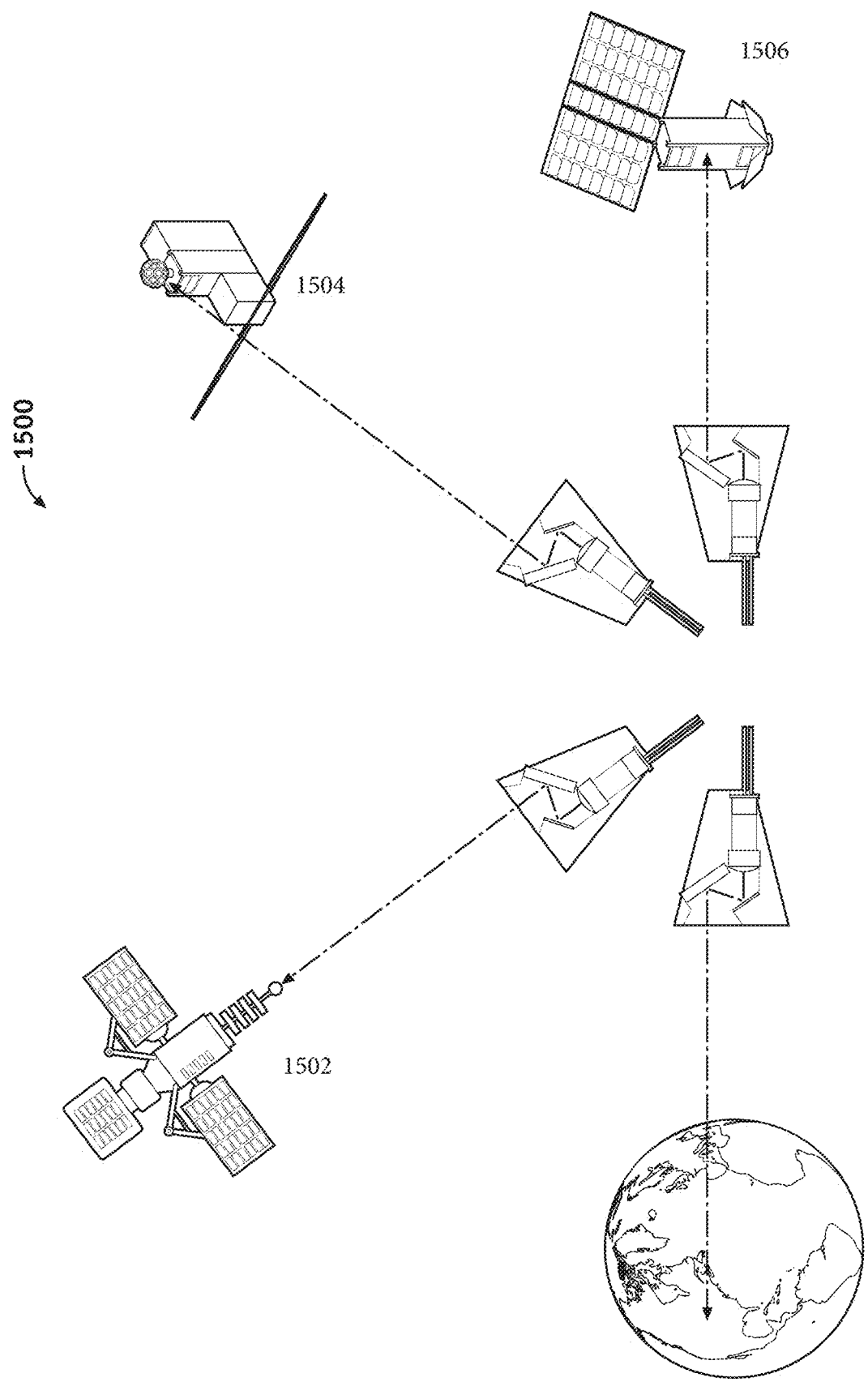
FIG. 15 depicts an example of the simultaneous multiple link capability of the omnidirectional optical communicator.

FIG. 15 depicts an example of a simultaneous multiple link capability of the omnidirectional optical communicator. An array of laser transmitters that can be housed in an omnidirectional optical communicator are shown transmitting to earth, and to several other spacecraft 1502, 1504, 1506 simultaneously.

Figure 16:
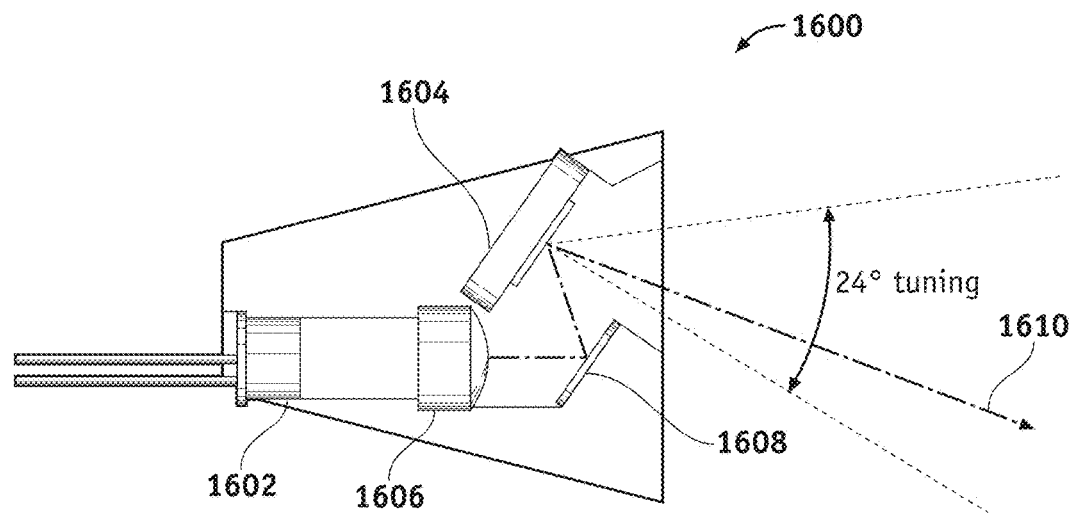
FIG. 16 shows an example of further details of the omnidirectional optical communicator transmit telescope.

FIG. 16 shows an example of further details of the omnidirectional optical communicator transmit telescope. FIG. 16 shows an omnidirectional optical communicator transmit telescope 1600. The transmit telescope includes a laser diode 1602, a collimator 1606, a fixed mirror 1608, a steerable MEMS mirror 1604. The laser diode 1602 generates a laser beam, which is then collimated by the collimator 1606 before it strikes the fixed mirror 1608. The fixed mirror 1608 directs the laser onto the MEMS mirror 1604, where the MEMS mirror steers the optical laser beam 1610 within its field of regard. In this example the steerable MEMS mirror has a tuning range of 24°.

Figure 17:
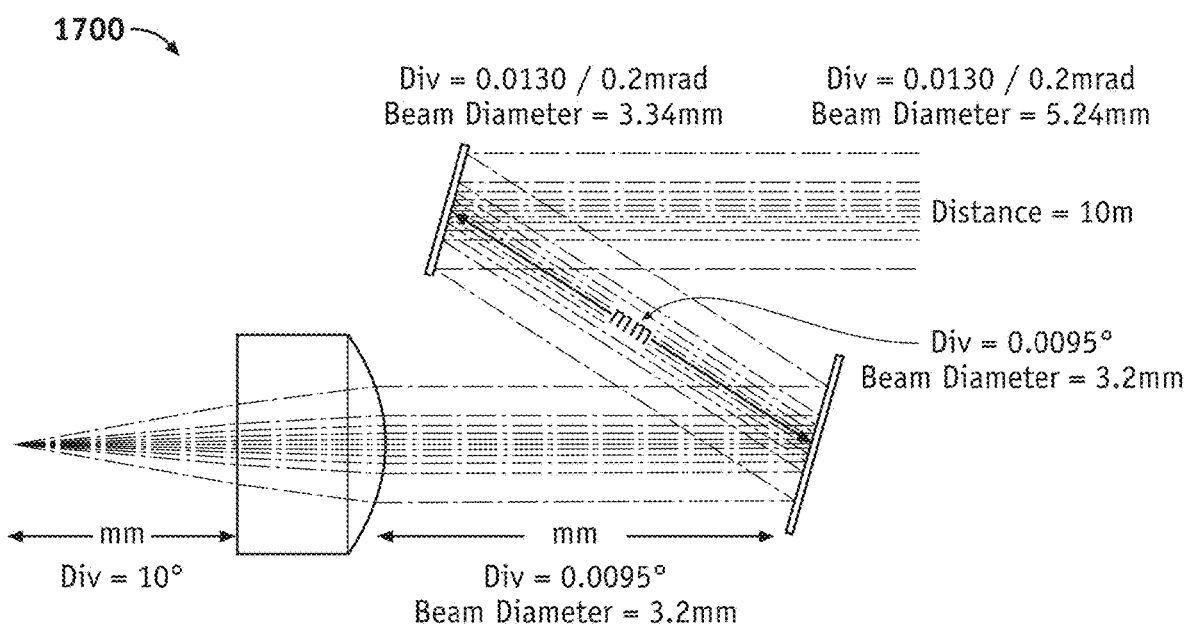
FIG. 17 shows an example of a Zemax™ simulation of omnidirectional optical communicator transmitter telescope, showing the beam diameter at a distance of 10 meters.

FIG. 17 shows an example of a simulation of omnidirectional optical communicator transmitter telescope, showing the beam diameter at a distance of 10 meters. The Zemax simulation shows the laser beam passing through a collimator, striking a fixed mirror and then directed to a steerable MEMS mirror. In this example, the laser beam diameter is shown to be 5.24 mm at a distance of 10 m.

Figures 18A, 18B, 18C:
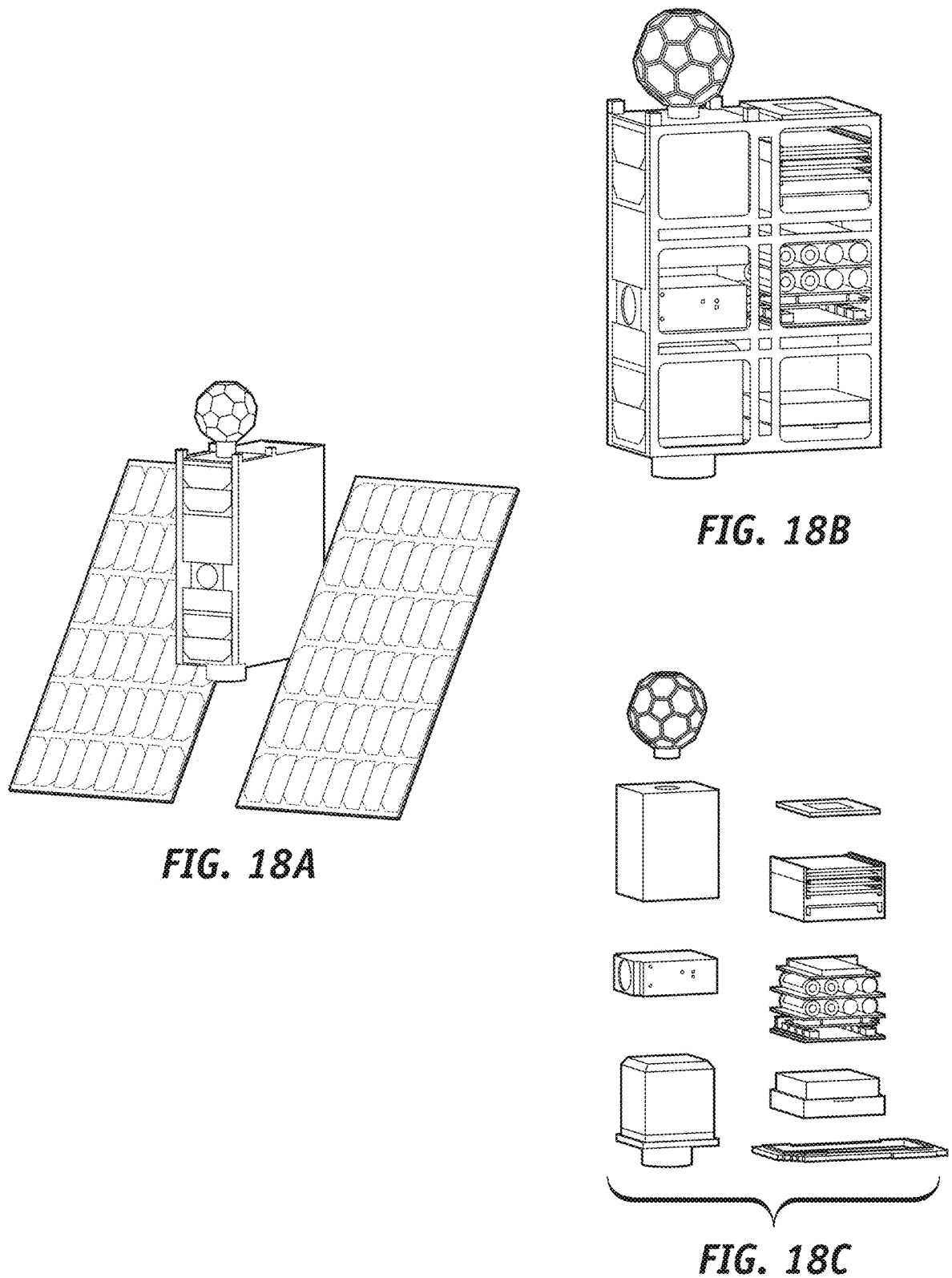
FIGS. 18A-18C show examples of a CubeSat, and the detailed components inside the CubeSat.

FIGS. 18A-18C show examples of a CubeSat, and the detailed components inside the CubeSat. CubeSat can be fitted with an omnidirectional optical communicator device as shown in FIG. 18A. FIG. 18B-18C shows the components inside a CubeSat.

Figure 19:
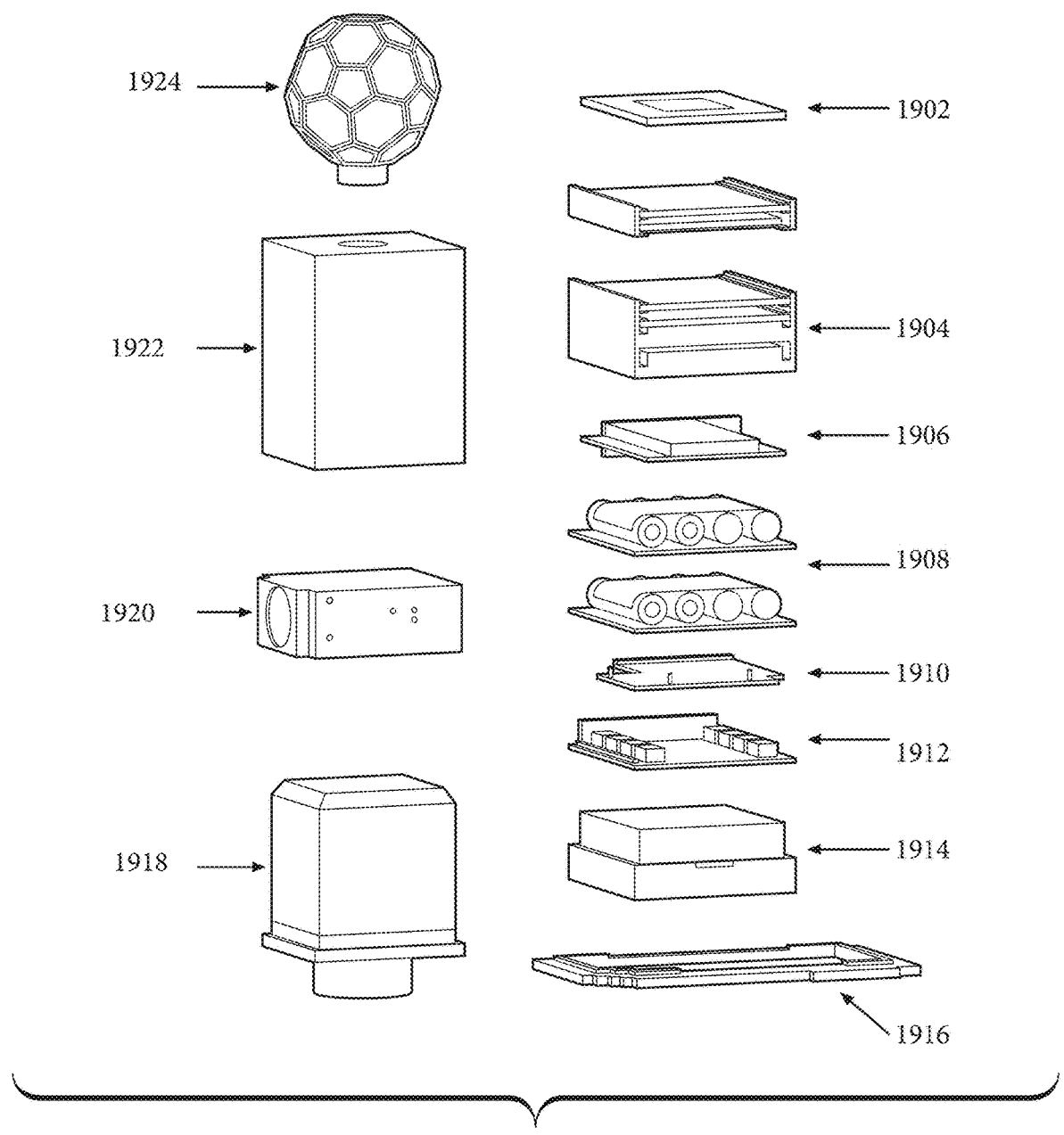
FIG. 19 shows an example of further details of the components of a CubeSat.

FIG. 19 shows an example of further details of the components of a CubeSat. In this example, the CubeSat is shown to include an inter-spacecraft omnidirectional optical communicator (ISOC) assembly 1924, an ISOC deployer 1922, and XACT attitude control solution (ADCS) 1920, which enables a CubeSat to point with high accuracy. The CubeSat further includes a MiPS cold gas thruster 1918, an S-band antenna 1902, an IRIS 1904 transponder, a global position systems (GPS) 1906, a pack of EPS 38 Wh battery 1908, a computer 1910, a power supply 1912, an SLX transceiver 1914 and a UHF antenna 1916.

Figure 20:
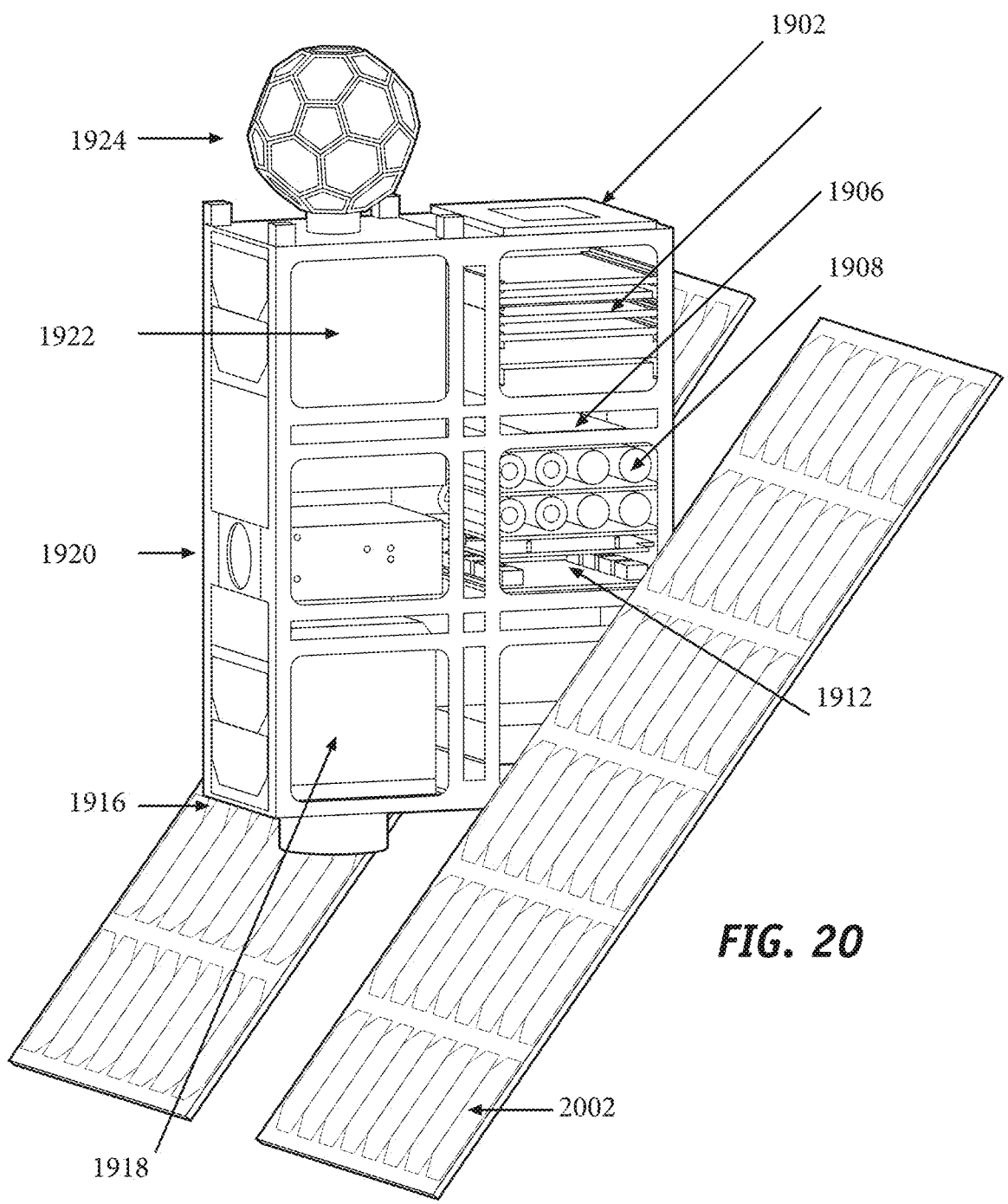
FIG. 20 shows an example of details of a CubeSat, including the solar panels.

FIG. 20 shows an example of details of a CubeSat, including the solar panels. The solar panels 2002 are shown affixed to both sides of the CubeSat. The components of CubeSat shown in previous FIG. 19 are also shown in FIG. 20.

Figure 21:
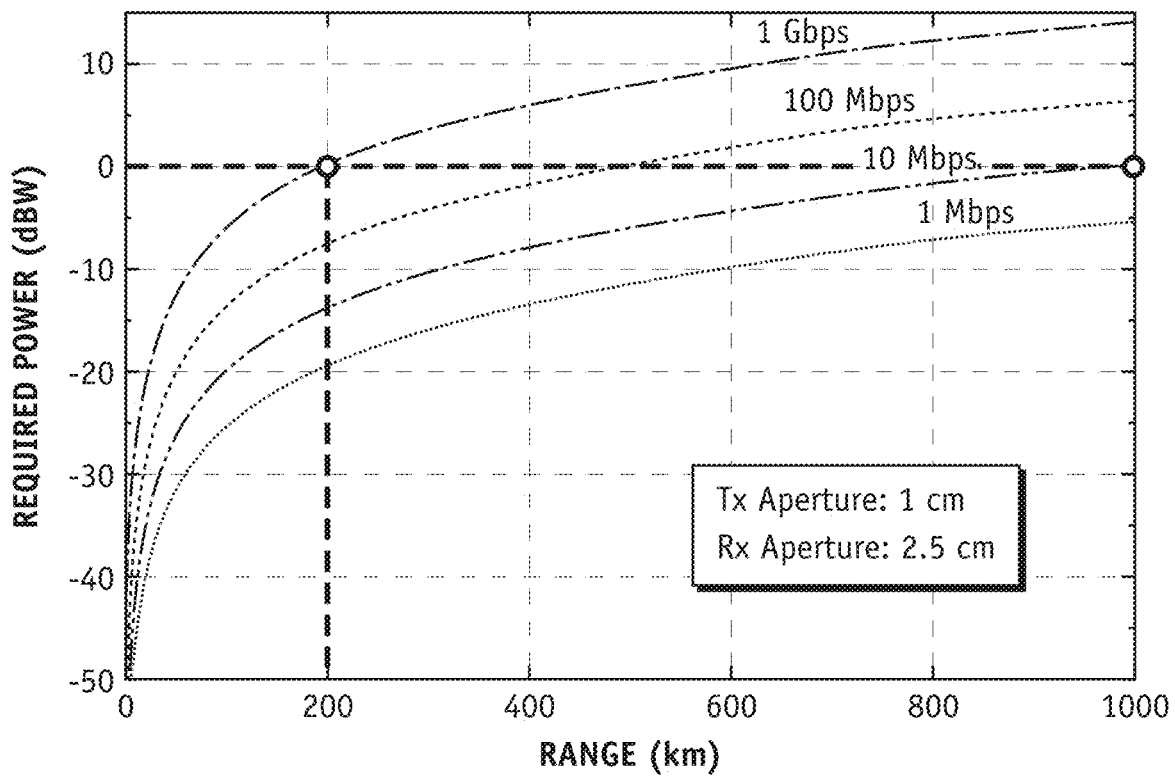
FIG. 21 shows an example of a graph of data showing the calculated required power as a function of range for transmit aperture of 1.0 cm and transmit aperture of 2.5 cm.

FIG. 21 shows an example of a graph of data showing the calculated required power as a function of range for transmit aperture of 1.0 cm and transmit aperture of 2.5 cm. For example, for a 1.0 gigabits per second at a distance of 200 km, the power required is 0.0 dBW.

Figure 22:
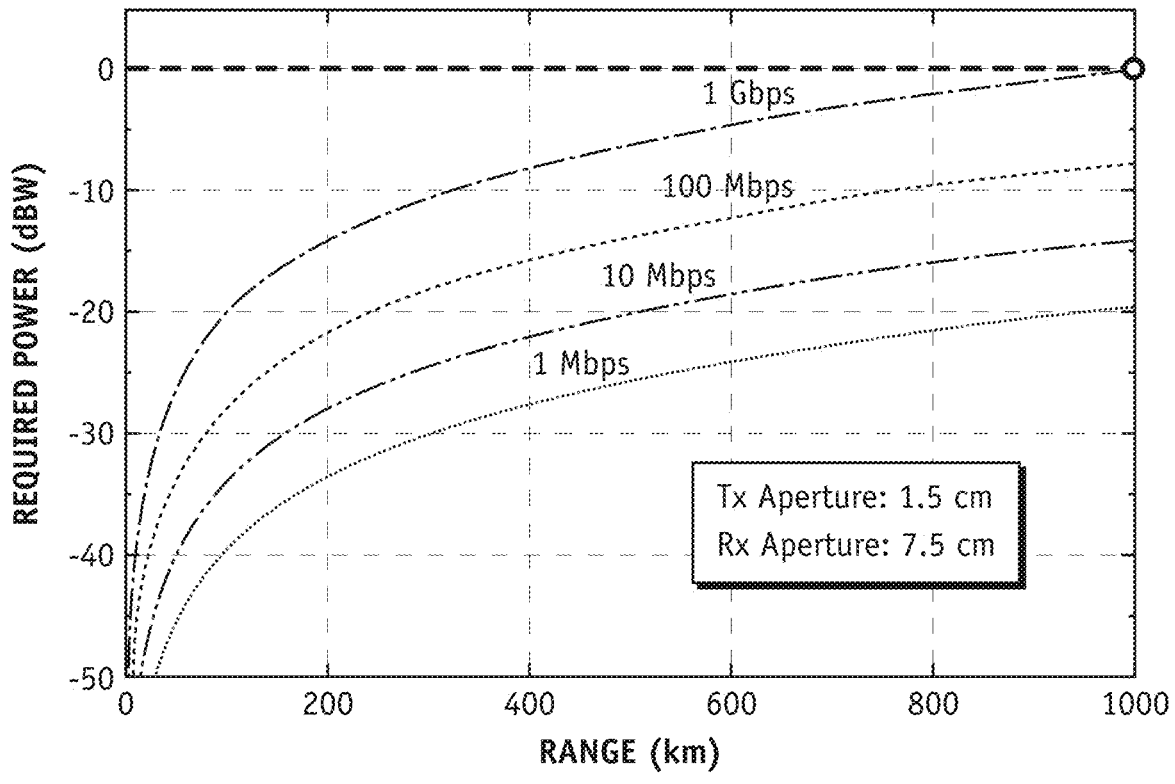
FIG. 22 shows an example of a graph of data showing the calculated required power as a function of range for transmit aperture of 1.5 cm and transmit aperture of 7.5 cm.

FIG. 22 shows an example of a graph of data showing the calculated required power as a function of range for transmit aperture of 1.5 cm and transmit aperture of 7.5 cm. For this aperture sizes, for a 1.0 gigabits per second at a distance of 1000 km, the power required is 0.0 dBW. Thus, with the larger aperture sizes higher data rates can be achieved, or alternatively with the same power level, greater distances can be achieved.

Figure 23:
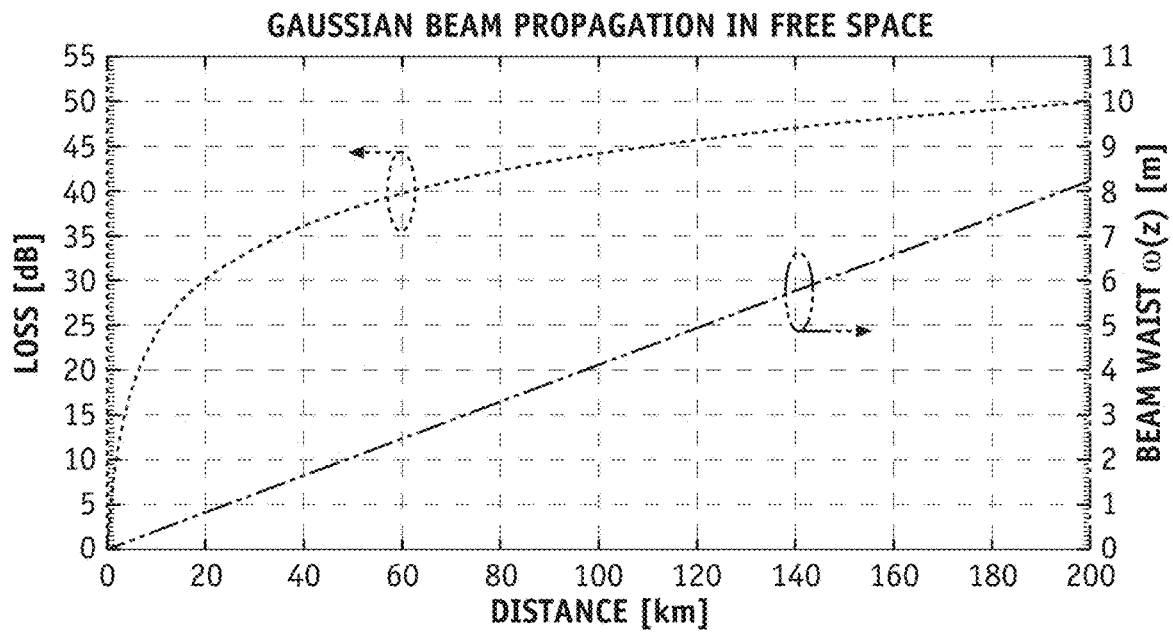
FIG. 23 shows an example of a simulation plot of the amount of divergence and the corresponding loss over 200 km for a transmit aperture of 1.2 cm and a receive aperture of 3.6 CM.

FIG. 23 shows an example of a simulation plot of the amount of divergence and the corresponding loss over 200 km for a transmit aperture of 1.2 cm and a receive aperture of 3.6 cm. This plot shows Gaussian beam propagation in free space. The loss is shown on the Y-axis on the left and the beam waist is shown on the Y-axis on the right.

Figure 24:
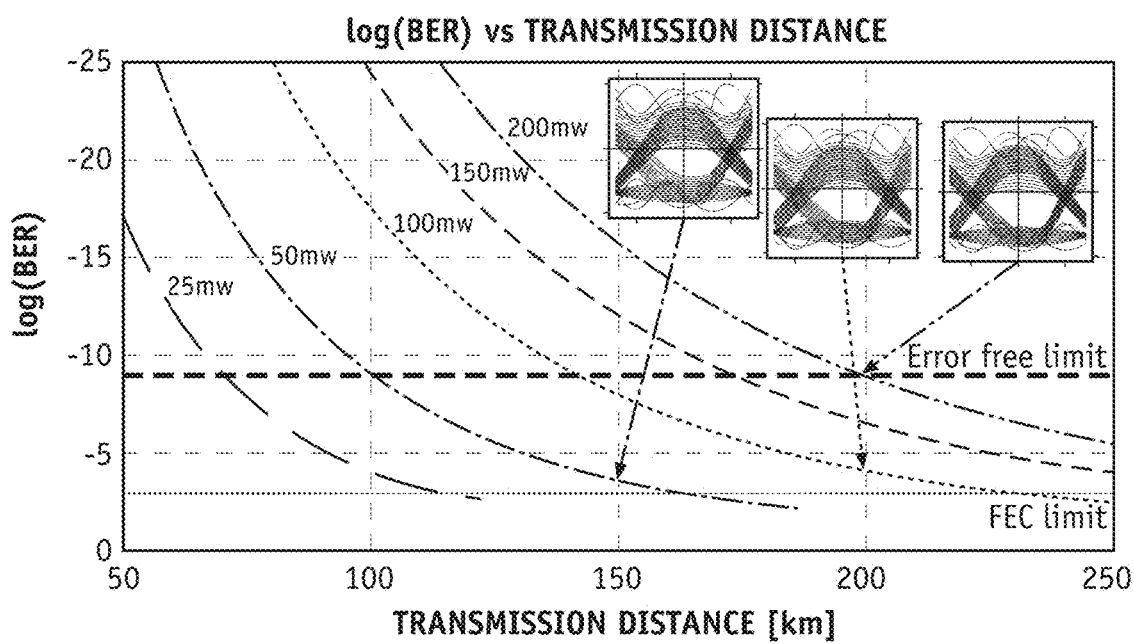
FIG. 24 depicts an example of a simulation plot showing transmission performance of omnidirectional optical communicator at 1 Gbit/s for several transmitted laser power levels.

FIG. 24 depicts an example of a simulation plot showing transmission performance of omnidirectional optical communicator at 1 Gbit/s for several transmitted laser power levels. The log of bit error rate (BER) is plotted as a function of transmission distance. It can be seen that with 200 mW of transmission power, 1 Gbit/s data rate is achieved at a distance of 200 km with a BER of 10-9. The "eye" diagram show that the signal is healthy under these conditions.

Figure 25A:
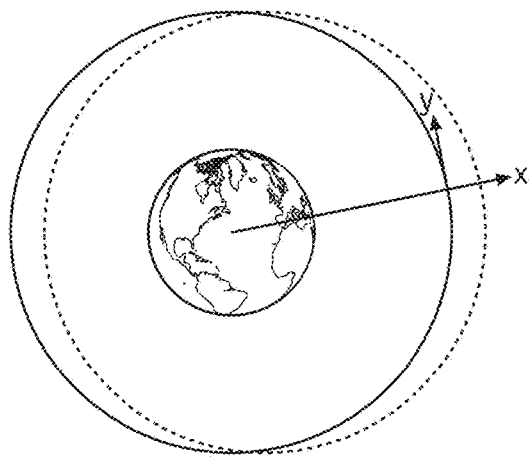
FIGS. 25A-25B show examples of an orbit of a target spacecraft in a circular orbit, and a chaser spacecraft in an elliptical or circular orbit.
Figure 25B:
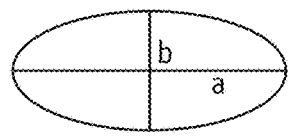

FIGS. 25A-25B show examples of an orbit of a target spacecraft in a circular orbit, and a chaser spacecraft in an elliptical or circular orbit. The Clohessey-Wiltshire equations are used to describe the chaser spacecraft motion in target frame. It is shown that with same semi-major axis and same period, the relative motion is repetitive.

$$\ddot{x} - 2n\dot{y} - 3n^2x = f_x$$

$$\ddot{y} + 2n\dot{x} = f_y$$

$$\ddot{z} + n^2z = f_z$$

$$n = \sqrt{\frac{\mu}{a^3}}$$

Figure 26:
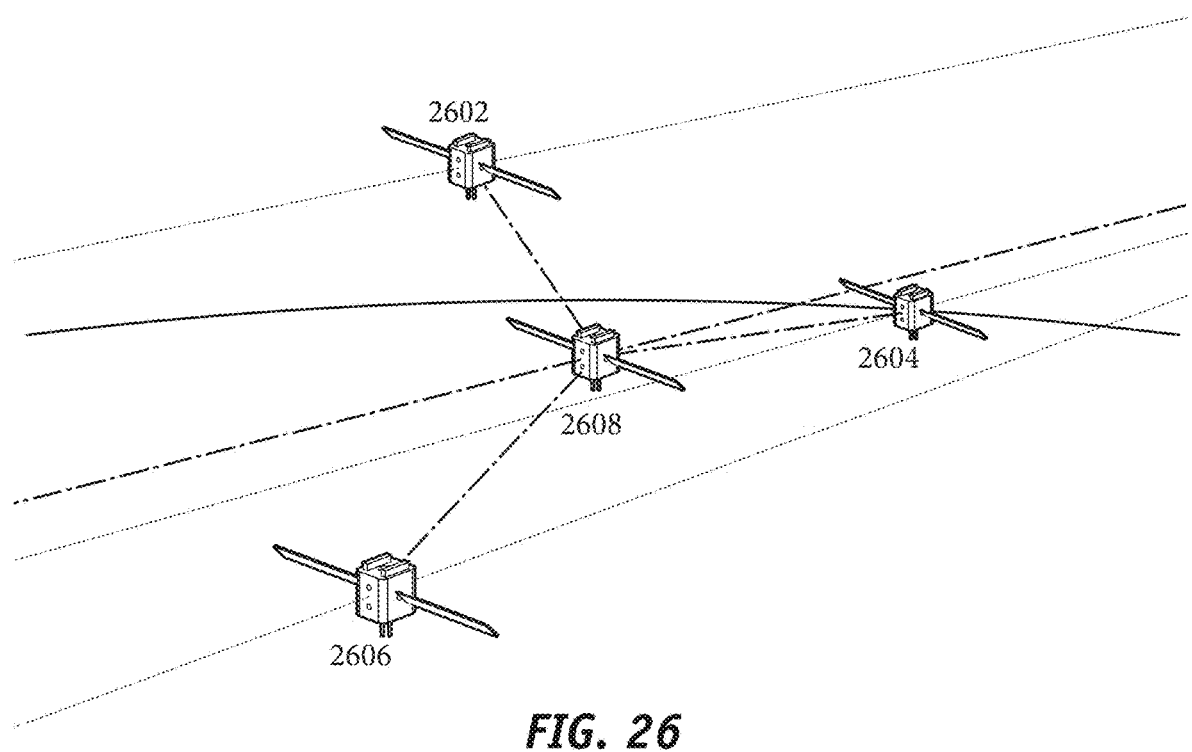
FIG. 26 shows an example of a chosen configuration for an array of satellites with omnidirectional optical communicator.

FIG. 26 shows an example of a chosen configuration for an array of satellites with omnidirectional optical communicator. There are three chaser satellites 2602, 2604 and 2606 shown in this configuration around the target satellite 2608. This spacecraft swarm is suitable for testing the omnidirectional optical communicator. As the entire swarm orbits Earth, the chaser spacecraft slowly rotate about the target spacecraft.

Figure 27:
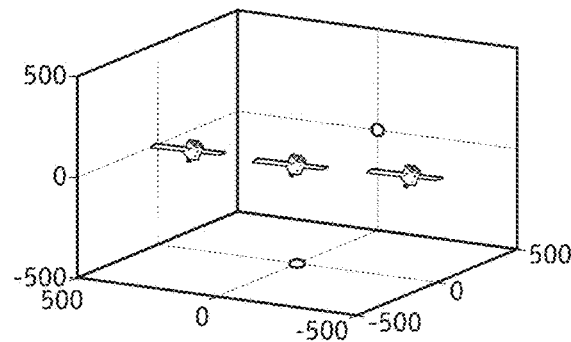
FIG. 27 shows examples of possible configurations of orbital dynamics.
Figure 27:
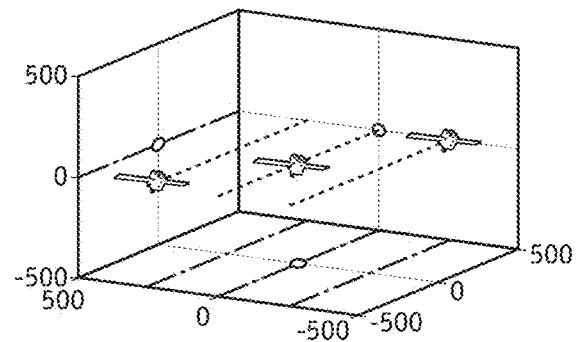
Figure 27:
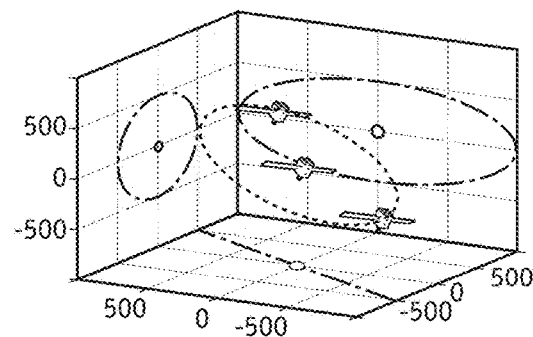
Figure 27:
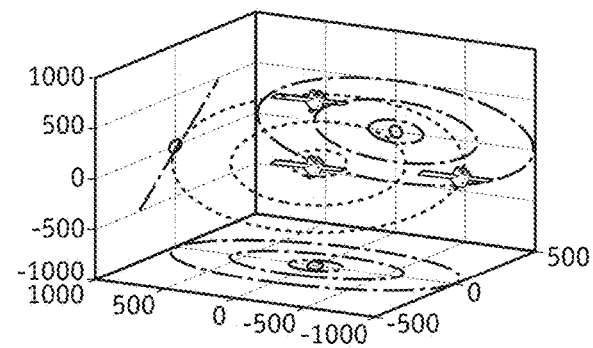
Figure 27:
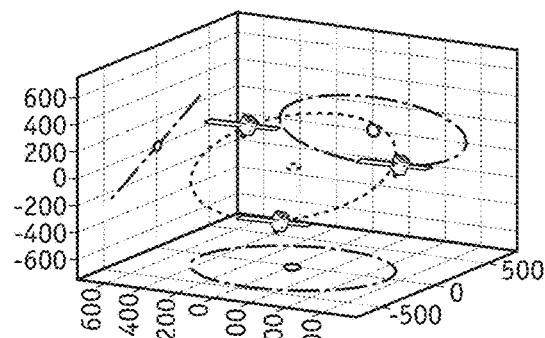
Figure 27:
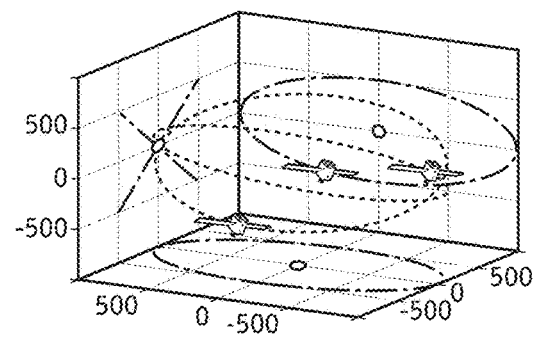

FIG. 27 shows an example of possible configurations of orbital dynamics. Homogenous analytical solution using the below equations, $$x = A_x \cos(nt + \alpha)$$

$$y = -2A_y \sin(nt + \alpha) + y_{off}$$

$$z = A_z \cos(nt + \beta)$$

will yield that X, Y motion is coupled, while Z motion is free. FIG. 27 azimuth scan is described by the above equations of motion which describe an elliptical motion with axes Ax and 2Ax.

Figure 28A:
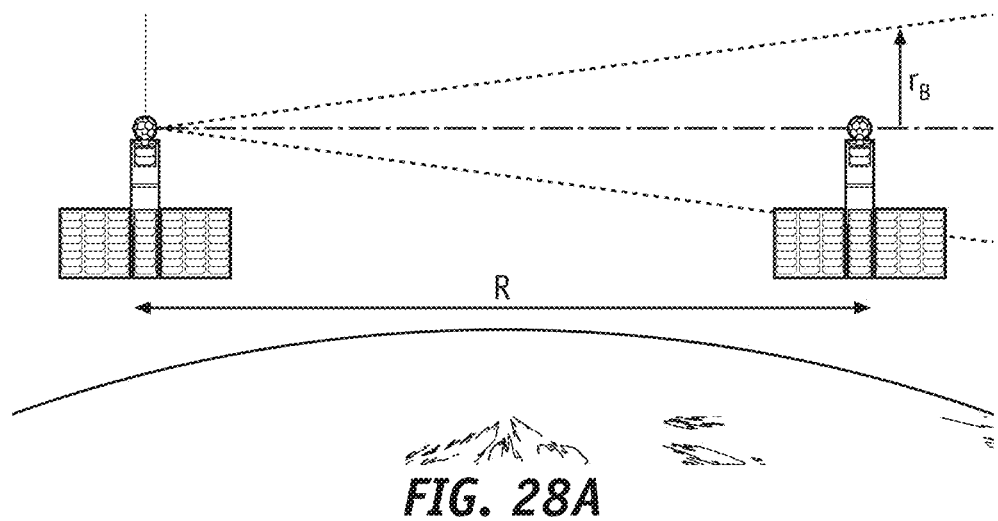
FIGS. 28A-28C show examples of satellite attitude control requirements.
Figure 28B:
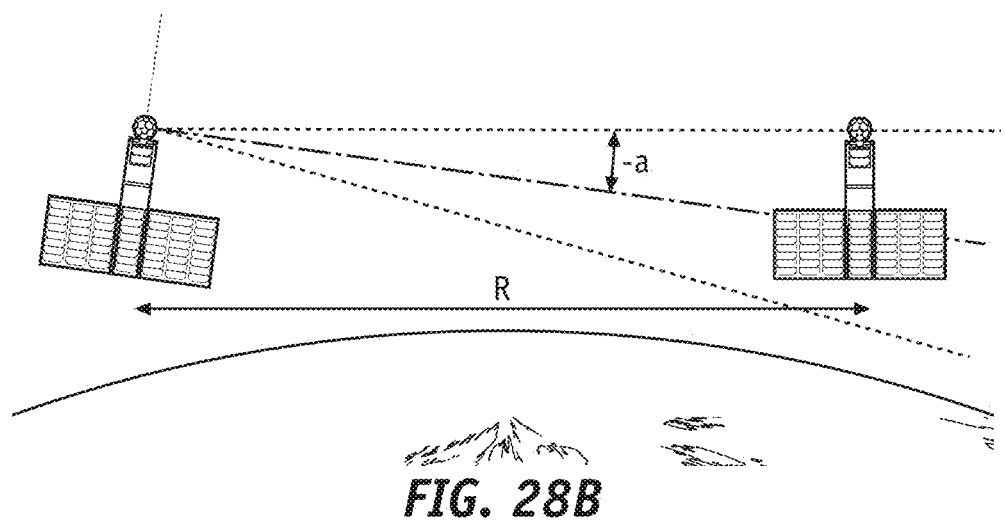
Figure 28C:
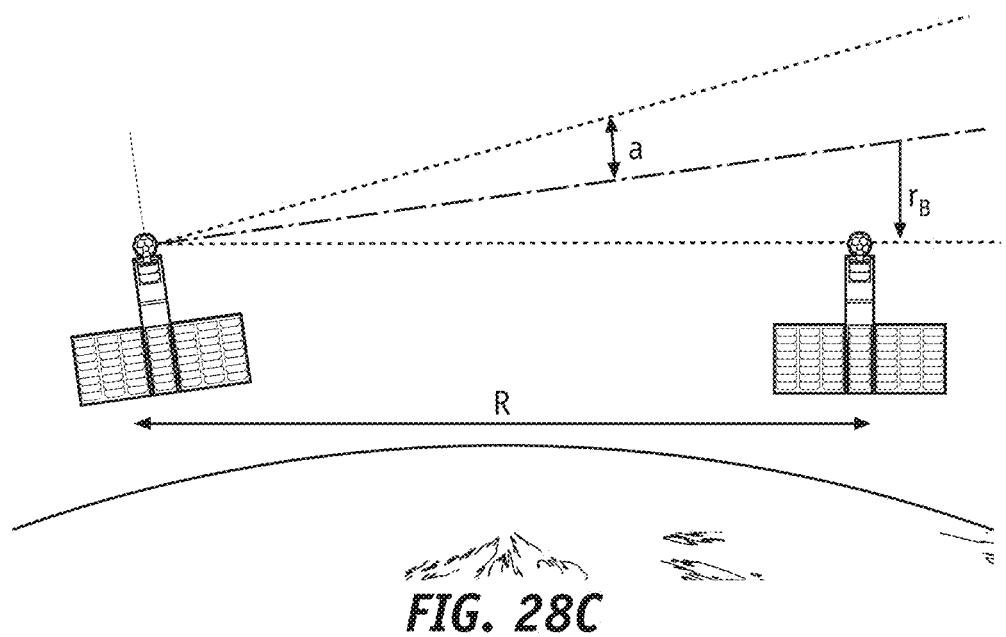

FIGS. 28A-28C show examples of satellite attitude control requirements. These figures depict attitude control for a satellite with an omnidirectional optical communicator at a distance R. The pointing variation angle a will dictate the size $2r_B$ of the optical beam on target. Current commercial attitude determination and control systems (ADCS) provide millidegree pointing control, which should be suitable for proper operation of the omnidirectional optical communicator.

Figure 29:
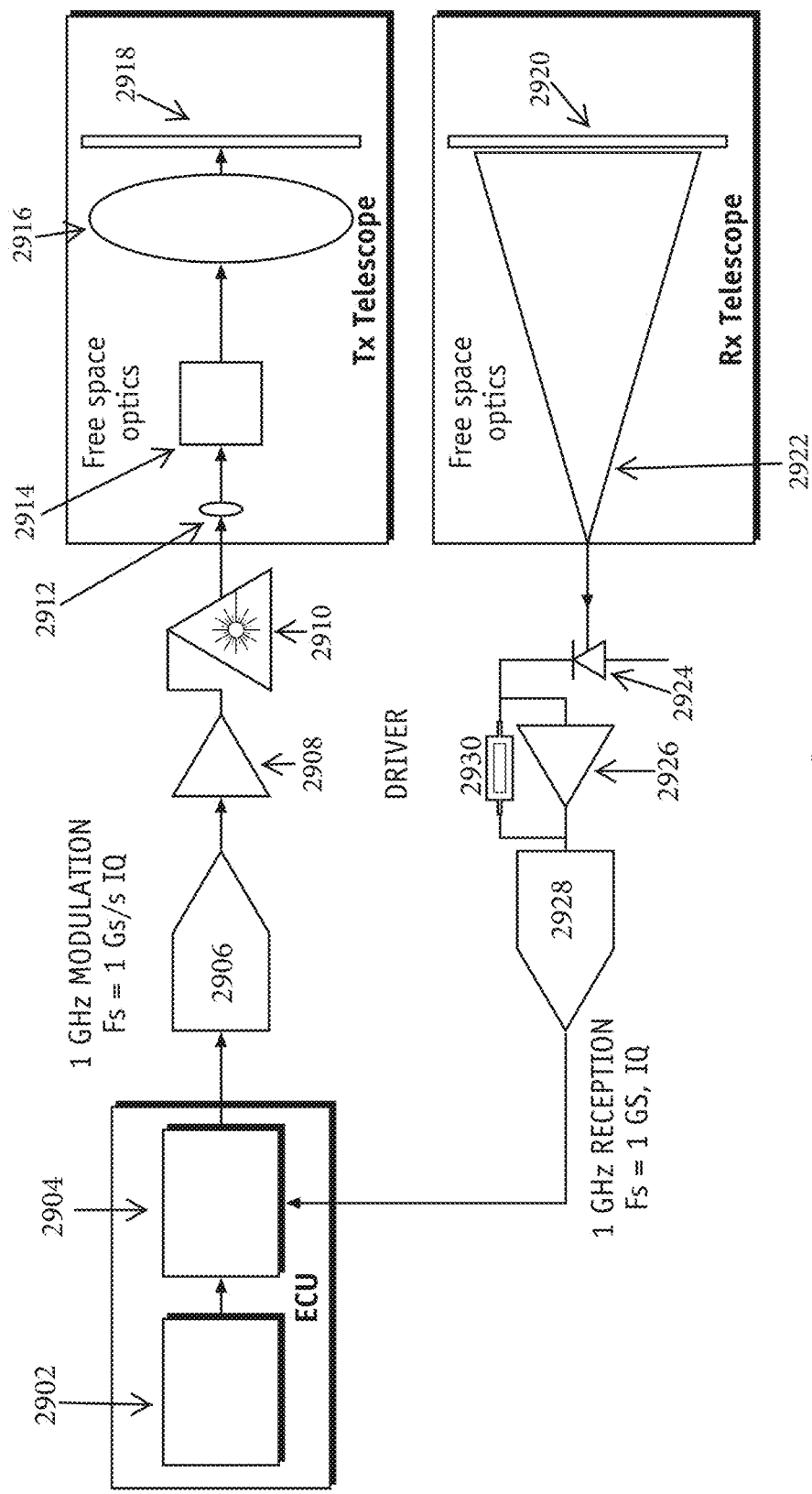
FIG. 29 shows an example of an electrical schematic of one embodiment of omnidirectional optical communicator transceiver.

FIG. 29 shows an example of an electrical schematic of one embodiment of omnidirectional optical communicator transceiver. The transmit path includes a host central processing unit (CPU) 2902 driving an FPGA 2904. The output of the FPGA drives digital-to-analog converter (DAC) 2906. The output of the DAC is driven into a laser driver 2908. The output of the driver 2908 drives a laser diode 2910. The laser emitted by the laser diode passes through a lens 2912 and is collimated, which then strikes a steerable mirror 2914. The laser beam then passes through a transmit aperture 2916 that could multiply the steering angle and an optical filter 2918.

The receive path includes an optical filter 2920, a receiving funnel telescope 2922 which focuses the received beam onto a photo detector (PD) 2924. The PD 2924 drives a trans-impedance amplifier (TIA) 2926. The output of the TIA 2926 is converted to analog signals via an analog-to-digital converter (ADC) 2928. The output of the ADC 2928 is sent to the FPGA 2904 for processing in the host CPU 2902.

Figure 30:
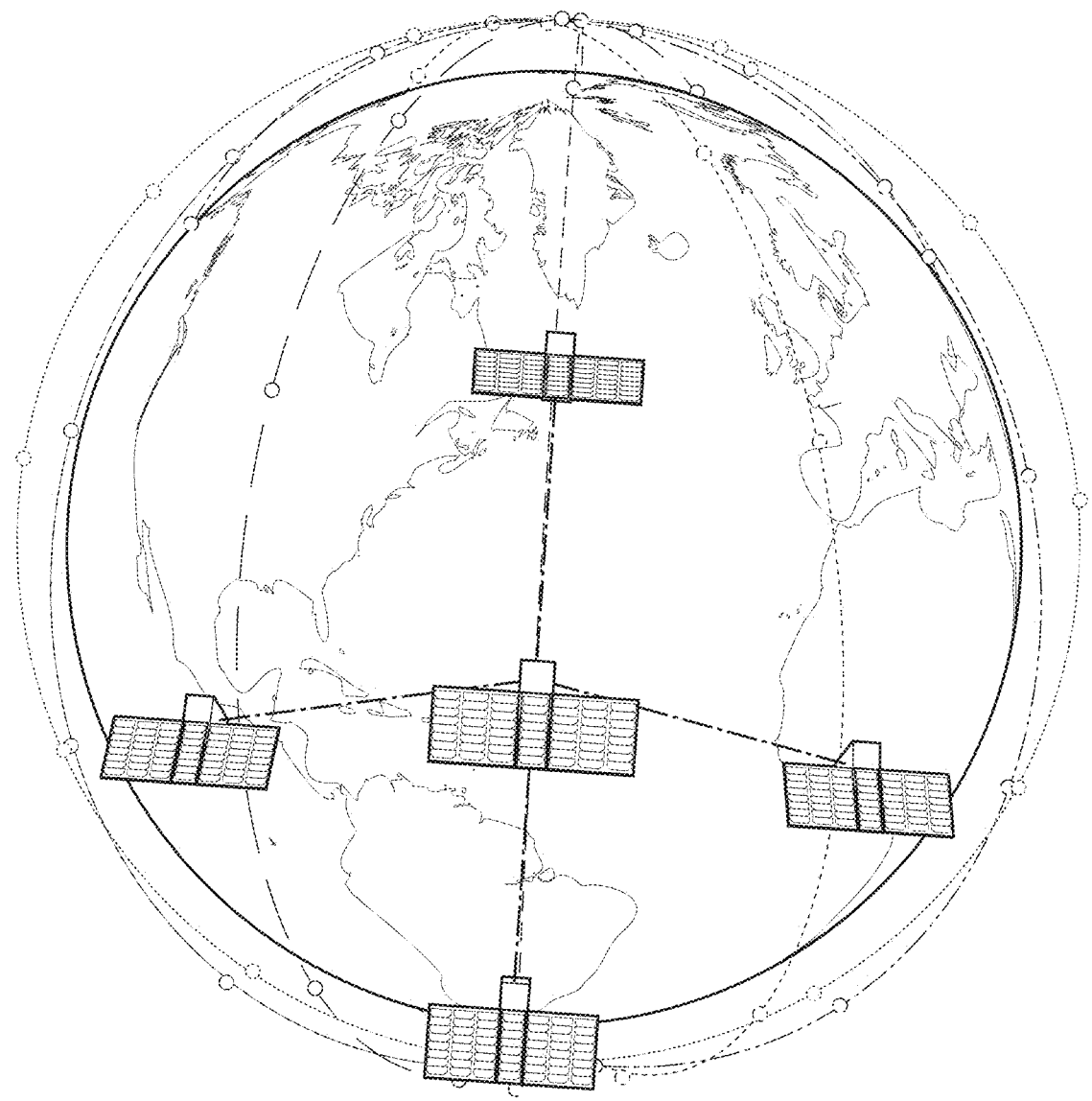
FIG. 30 depicts an example of a constellation of 66 CubeSats using omnidirectional optical communicator for full earth coverage.

FIG. 30 depicts an example of a constellation of 66 CubeSats using omnidirectional optical communicators for full earth coverage. This CubeSat constellation, furnished with omnidirectional optical communicators, could enable gigabit Ethernet and communications access everywhere.

Figure 31:
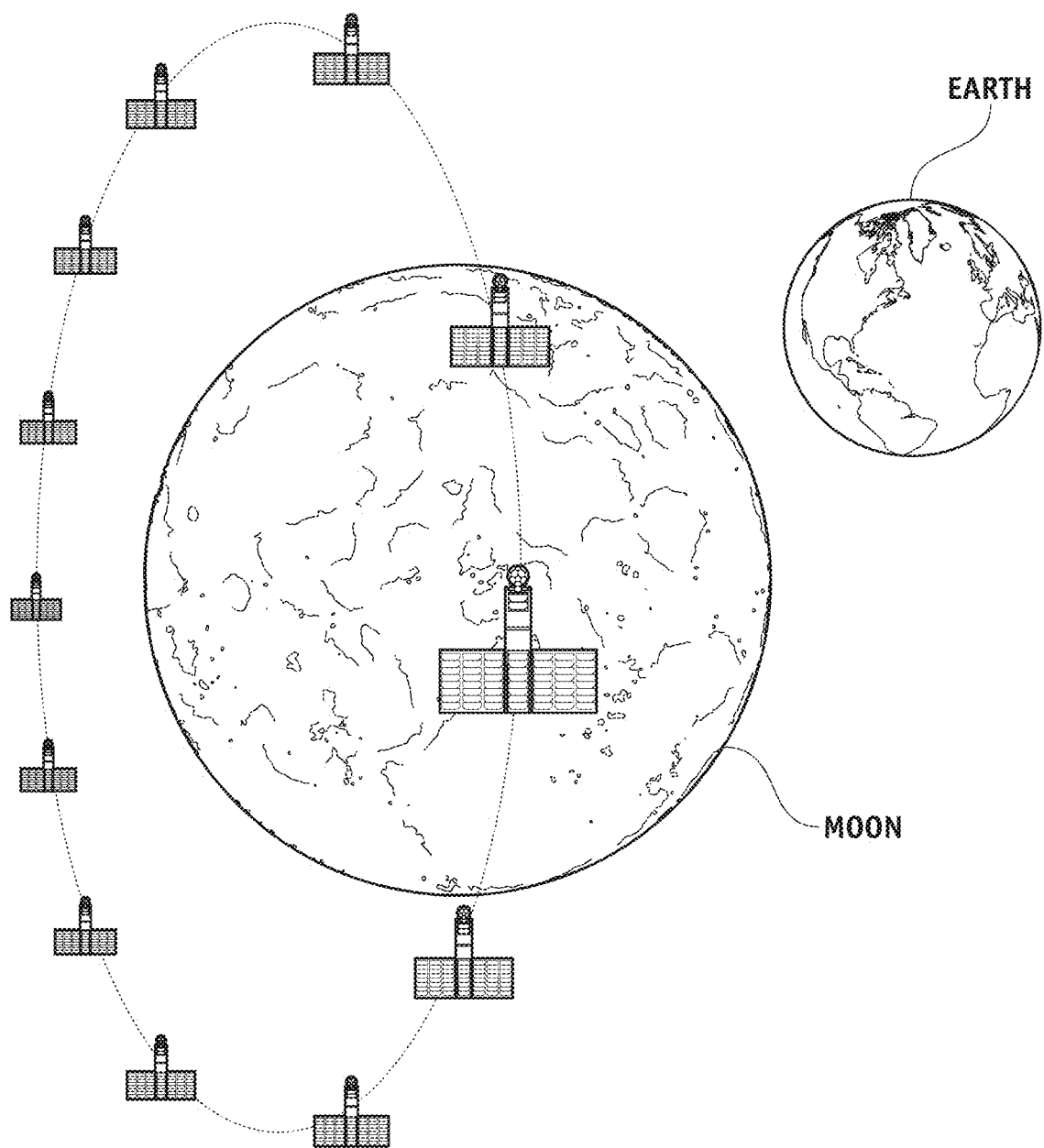
FIG. 31 depicts an example of a mission concept for an omnidirectional optical communicator using constellation of CubeSats forming a lunar radio telescope.

FIG. 31 depicts an example of a mission concept for an omnidirectional optical communicator using constellation of CubeSats forming a lunar radio telescope. In this radio telescope application, all the CubeSats can share information among themselves at gigabit rates using omnidirectional optical communicators.

Figure 32:
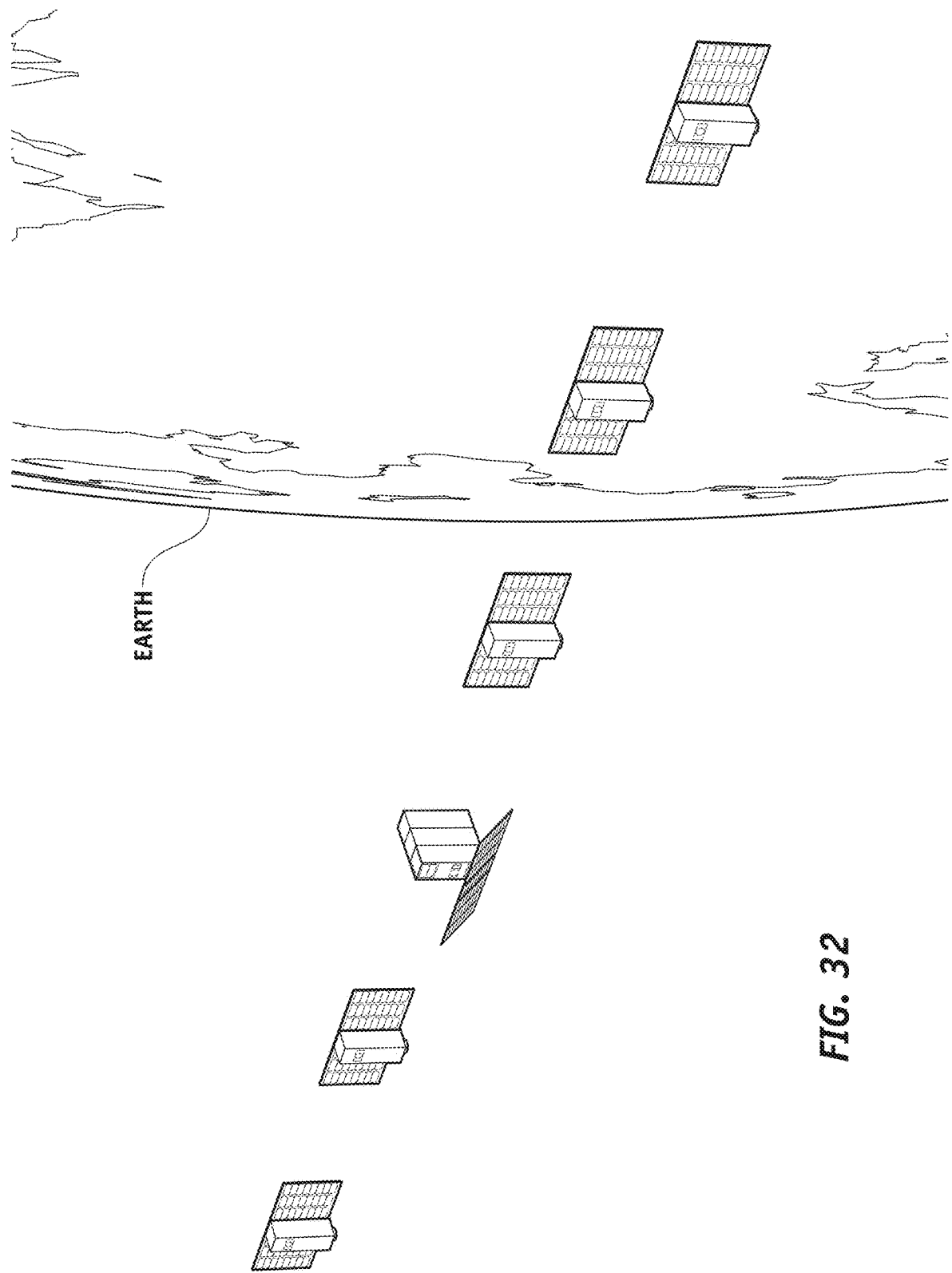
FIG. 32 depicts an example of a reconfigurable phase array radar concept based on formation flying of omnidirectional optical communicators using CubeSats.

FIG. 32 depicts an example of a reconfigurable phase array radar concept based on formation flying CubeSats fitted with omnidirectional optical communicators. Each CubeSat furnished with smaller transceiver radar modules could work together as one much larger radar sensor by combining information via the omnidirectional optical communicator.

In order to establish communication between two omnidirectional optical communicators, each system could be furnished with positioning information, such as global positioning satellite (GPS). In addition, each omnidirectional optical communicator may include an angle-of-arrival (AoA) system (also referred to herein as direction-of-arrival DOA), which allows the calculation of the AoA information from an incoming signal. Once AoA information is achieved, the corresponding laser transmitter could be steered in the AoA direction for establishing communications with the pairing omnidirectional optical communicator. Thus, the purpose of the AoA mechanism is to determine exact position of the pairing omnidirectional optical communicator and to steer its transmitter in that direction for establishing full communications.

As an example, two omnidirectional optical communicator devices are linked together (one transmitting and one receiving) to transfer information (e.g., an image). The transmitting omnidirectional optical communicator "T", upon intercepting the pairing signal, would use its AoA system to determine the exact location of the other omnidirectional optical communicator "R". After that, "T" will activate and direct the corresponding laser in the AoA direction to in this way start the transfer of the image, in this case. The AoA mechanism is always active so that it can monitor any changes in AoA to keep the link alive. Depending on the omnidirectional optical communicator's aperture size and distance, image transfer could be achieved at multi gigabit per second speeds.

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, or parallel fashion.

It is to be understood that the foregoing description is intended to illustrate and not to limit the scope of the invention, which is defined by the scope of the following claims, and that other embodiments are within the scope of the claims. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. An omnidirectional optical communication system, comprising:
   a multifaceted structure comprising a) an outer surface that comprises multiple facets of the multifaceted structure, and b) an inner space of the multifaceted structure that is bounded by the outer surface;
   a laser transmitter having a steerable mechanism;
   an optical detector having a focusing lens; and
   an angle-of-arrival system,
      wherein the laser transmitter, the optical detector and the angle-of-arrival system are all housed in the inner space of the multifaceted structure to enable omnidirectional optical communication for transmitting and receiving optical data signals through the multiple facets, the omnidirectional optical communication system being capable of multi gigabits per second data transfer rates.

2. The omnidirectional optical communication system of claim 1, further comprising a high aperture lens.

3. The omnidirectional optical communication system of claim 1, further comprising a global positioning system.

4. The omnidirectional optical communication system of claim 1, wherein the multifaceted structure has a shape of dodecahedron geometry.

5. The omnidirectional optical communication system of claim 1, wherein the laser transmitter further comprises a MEMS mirror.

6. The omnidirectional optical communication system of claim 1, wherein the optical detector further comprises an avalanche photo detector.

7. The omnidirectional optical communication system of claim 1, further comprising a CPU, an FPGA, and a digital-to-analog converter.

8. The omnidirectional optical communication system of claim 7, further comprising a trans-impedance amplifier and an analog-to-digital converter.

9. The omnidirectional optical communication system of claim 1, wherein the laser transmitter further comprises a collimator.

10. A method of omnidirectional optical communication, comprising:
   providing a first and a second omnidirectional optical communication system according to claim 1;
   having the first omnidirectional optical communication system to provide a pairing signal;
   having the second omnidirectional optical communication system determine an exact location of the first omnidirectional optical communication system upon intercepting the pairing signal;
   having the first omnidirectional optical communication system to activate and direct a corresponding laser transmitter in a direction of the second omnidirectional optical communication system by using its angle-of-arrival system, and having the first omnidirectional optical communication system to start a transfer of information.

11. A method of using an omnidirectional optical system, comprising:

providing the omnidirectional optical communication system according to claim 1; and providing a spacecraft, wherein the omnidirectional optical communication system is housed within the spacecraft, and the omnidirectional optical communication system is used by the spacecraft to establish communication in an omnidirectional way.

12. A method of using an angle-of-arrival system in an omnidirectional optical system, the method comprising:

providing the omnidirectional optical communication system according to claim 1, wherein the omnidirectional optical communication system further comprises a global positioning system;

having the angle-of-arrival system calculate an angle of arrival information from an incoming signal; and steering the laser transmitter in the direction of the angle of arrival, thereby establishing communications with a pairing omnidirectional optical communication system, wherein the angle-of-arrival system calculates an exact position of the pairing omnidirectional optical communication system.

13. The method of claim 12, wherein the omnidirectional optical system, the multifaceted structure has a shape of dodecahedron geometry.

14. The method of claim 12, wherein the laser transmitter further comprises a MEMS mirror.

15. The method of claim 12, wherein the optical detector further comprises an avalanche photo detector.

16. A method of using an omnidirectional optical system, comprising:

providing the omnidirectional optical communication system according to claim 1, wherein steering angle provided by the steerable mechanism and the number of facets is selected so as to provide communication coverage of full sky without blind zones.

17. A method of using an omnidirectional optical system, comprising:

providing a multifaceted structure comprising a) an outer surface that comprises multiple facets of the multifaceted structure, and b) an inner space of the multifaceted structure that is bounded by the outer surface;

providing a beam steering mechanism;

providing an optical detector having a focusing lens;

providing an angle-of-arrival system; and housing the beam steering mechanism, the optical detector and angle-of-arrival system in the inner space of the multifaceted structure, wherein the multifaceted structure, the beam steering mechanism, the optical detector and the angle-of-arrival system are used to provide communication coverage of full sky without blind zones by transmitting and receiving optical data signals through the multiple facets, the omnidirectional optical communication system being capable of multi gigabits per second data transfer rates.

18. The method of claim 17, further comprising providing a transmit laser and a receive detector, wherein the transmit laser and the receive detector are selected to allow the multi gigabit per second data transfer rates.

19. A method of using an omnidirectional optical system, comprising:

providing a multifaceted structure, a plurality of laser transmitters, an optical receiver;

and an angle-of-arrival system:

calculating, by the angle-of-arrival system, an angle of arrival information from an incoming signal or from multiple incoming signals, and steering the plurality of laser transmitters in directions of the angle of arrival, thereby establishing simultaneous communications with multiple omnidirectional optical communication systems.

20. The omnidirectional optical communication system of claim 1, wherein the transmitting of the optical data is through a facet of the multiple facets that is different from a facet of the multiple facets used for the receiving of the optical data.

* * * * *